(12) United States Patent
Lindsey et al.

(10) Patent No.: US 12,210,346 B2
(45) Date of Patent: *Jan. 28, 2025

(54) METHODS AND SYSTEMS FOR DETERMINING FLIGHT PLANS FOR VERTICAL TAKE-OFF AND LANDING (VTOL) AERIAL VEHICLES

(71) Applicant: AeroVironment, Inc., Arlington, VA (US)

(72) Inventors: Quentin Lindsey, Canoga Park, CA (US); Henry Thome Won, Simi Valley, CA (US)

(73) Assignee: AeroVironment, Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/516,038

(22) Filed: Nov. 21, 2023

(65) Prior Publication Data

US 2024/0094729 A1 Mar. 21, 2024

Related U.S. Application Data

(63) Continuation of application No. 17/387,804, filed on Jul. 28, 2021, now Pat. No. 11,860,633, which is a
(Continued)

(51) Int. Cl.
*G05D 1/00* (2024.01)
*B64C 29/00* (2006.01)
(Continued)

(52) U.S. Cl.
CPC ........... *G05D 1/0202* (2013.01); *B64C 29/00* (2013.01); *G08G 5/0034* (2013.01); *B64U 10/20* (2023.01);
(Continued)

(58) Field of Classification Search
CPC .... G05D 1/0202; B64C 29/00; B64C 39/024; B64D 47/08; G08G 5/0034
See application file for complete search history.

(56) References Cited

U.S. PATENT DOCUMENTS

| 9,646,502 B1 | 5/2017 | Gentry |
| 2007/0078572 A1 | 4/2007 | Deker et al. |

(Continued)

OTHER PUBLICATIONS

International Search Report and Written Opinion for PCT Application No. PCT/US19/15606, mailed Dec. 27, 2019.

*Primary Examiner* — Peter D Nolan
*Assistant Examiner* — Luke Huynh
(74) *Attorney, Agent, or Firm* — Command IP LLP; Pejman Yedidsion; Eric Aagaard

(57) ABSTRACT

Systems, devices, and methods for receiving, by a processor having addressable memory, data representing a geographical area for imaging by one or more sensors of an aerial vehicle; determining one or more straight-line segments covering the geographical area; determining one or more waypoints located at an end of each determined straight-line segment, where each waypoint comprises a geographical location, an altitude, and a direction of travel; determining one or more turnarounds connecting each of the straight-line segments, where each turnaround comprises one or more connecting segments; and generating, by the processor, a flight plan for the aerial vehicle comprising: the determined one or more straight-line segments and the determined one or more turnarounds connecting each straight-line segment.

20 Claims, 18 Drawing Sheets

Related U.S. Application Data continuation of application No. 16/260,866, filed on Jan. 29, 2019, now Pat. No. 11,086,325.

(60) Provisional application No. 62/623,473, filed on Jan. 29, 2018.

(51) Int. Cl.
*G08G 5/00* (2006.01)
*B64U 10/20* (2023.01)
*B64U 30/295* (2023.01)
*B64U 101/32* (2023.01)

(52) U.S. Cl.
CPC ........ *B64U 30/295* (2023.01); *B64U 2101/32* (2023.01); *B64U 2201/10* (2023.01); *G08G 5/003* (2013.01)

(56) References Cited

U.S. PATENT DOCUMENTS

| | | |
|---|---|---|
| 2014/0027131 A1 | 1/2014 | Kawiecki |
| 2015/0066248 A1 | 3/2015 | Arbeit et al. |
| 2016/0046374 A1* | 2/2016 | Kugelmass ............ G05D 1/042 701/8 |
| 2017/0300050 A1 | 10/2017 | Naito et al. |
| 2017/0334559 A1 | 11/2017 | Bouffard et al. |
| 2017/0337824 A1* | 11/2017 | Chen .................... G08G 5/0086 |
| 2019/0118945 A1 | 4/2019 | Loveland et al. |
| 2019/0228573 A1* | 7/2019 | Sen ........................ G01B 17/06 |
| 2021/0356964 A1 | 11/2021 | Lindsey et al. |

* cited by examiner

METHODS AND SYSTEMS FOR DETERMINING FLIGHT PLANS FOR VERTICAL TAKE-OFF AND LANDING (VTOL) AERIAL VEHICLES

CROSS-REFERENCE TO RELATED APPLICATIONS

This application is a continuation of U.S. Non-Provisional patent application Ser. No. 17/387,804, filed Jul. 28, 2021, which is a continuation of U.S. Non-Provisional patent application Ser. No. 16/260,866, filed Jan. 29, 2019, which issued as U.S. Pat. No. 11,086,325 on Aug. 10, 2021, which claims priority to and the benefit of U.S. Provisional Patent Application No. 62/623,473, filed Jan. 29, 2018, the contents of which are hereby incorporated by reference herein for all purposes.

TECHNICAL FIELD

Embodiments relate generally to unmanned aerial vehicles (UAVs), and more particularly to flight plans for UAVs.

BACKGROUND

Unmanned Aerial Vehicles (UAVs) have historically been operated by a variety of means including direct or manual control by a remote operator or pilot and by preprogrammed operations performed by the UAV. Manual flight control by a remote operator presents a variety of problems including accuracy and timing of control, which typically result in a significant reduction in quality, efficiency, and speed of operation.

SUMMARY

A method embodiment may include: receiving, by a processor having addressable memory, data representing a geographical area for imaging by one or more sensors of an aerial vehicle; determining, by the processor, one or more straight-line segments covering the geographical area; determining, by the processor, one or more waypoints located at an end of each determined straight-line segment, where each waypoint comprises a geographical location, an altitude, and a direction of travel; determining, by the processor, one or more turnarounds connecting each of the straight-line segments, where each turnaround comprises one or more connecting segments; and generating, by the processor, a flight plan for the aerial vehicle comprising: the determined one or more straight-line segments and the determined one or more turnarounds connecting each straight-line segment.

In additional method embodiments, the aerial vehicle may be a vertical take-off and landing (VTOL) aerial vehicle. The geographical area for imaging may include vegetation. The determined one or more straight-line segments may be spaced within the geographical area for imaging based on at least one of: a desired image resolution and a desired image overlap. Determining the one or more straight-line segments covering the geographical area may further include: determining, by the processor, one or more flight paths based on a rotation of each straight-line segment by set increments; and selecting, by the processor, a flight path of the determined one or more flight paths at an increment of the set increments using the least energy by the aerial vehicle to complete. The selected flight path may be based on at least one of: a wind speed, a wind direction, a shape of the geographical area, dimensions of the geographical area, and a presence of any obstacles in the geographical area.

In additional method embodiments, each of the determined one or more straight-line segments may be substantially parallel to each of the other determined one or more straight-line segments. The direction of travel of each waypoint may be the direction of travel of the aerial vehicle as the aerial vehicle passes through the waypoint. The one or more connecting segments comprise at least one of: one or more arcuate segments and one or more straight-line connectors. The one or more connecting segments may be based on the aerial vehicle characteristics. Each of the one or more connecting segments may include a starting point, a middle point, and an end point.

Additional method embodiments may include: determining, by the processor, a path from a take-off location of the aerial vehicle to a first waypoint of the one or more waypoints, where the first waypoint is the first waypoint reached by the aerial vehicle after take-off of the aerial vehicle and/or determining, by the processor, a path from a last waypoint of the one or more waypoints to a landing location of the aerial vehicle, wherein the last waypoint is the last waypoint reached by the aerial vehicle prior to landing of the aerial vehicle. The generated flight path may further include: the determined path from the take-off location of the aerial vehicle to the first waypoint and the determined path from the last waypoint to the landing location of the aerial vehicle. Additional method embodiments may include dividing, by the processor, the generated flight plan for the aerial vehicle into two or more flight plans based on the aerial vehicle characteristics.

A system embodiment may include: an aerial vehicle having one or more sensors for imaging; and a processor having addressable memory, the processor configured to: receive data representing a geographical area for imaging by the one or more sensors of the aerial vehicle; determine one or more straight-line segments covering the geographical area; determine one or more waypoints located at an end of each determined straight-line segment, where each waypoint comprises a geographical location, an altitude, and a direction of travel; determine one or more turnarounds connecting each of the straight-line segments, wherein each turnaround comprises one or more connecting segments; and generate a flight plan for the aerial vehicle comprising: the determined one or more straight-line segments and the determined one or more turnarounds connecting each straight-line segment.

In additional system embodiments, the aerial vehicle may be a vertical take-off and landing (VTOL) aerial vehicle. The determined one or more straight-line segments may be spaced within the geographical area for imaging based on at least one of: a desired image resolution and a desired image overlap, and where each of the determined one or more straight-line segments may be substantially parallel to each of the other determined one or more straight-line segments. The direction of travel of each waypoint is the direction of travel of the aerial vehicle as the aerial vehicle passes through the waypoint.

Another method embodiment may include: receiving data representing a geographical area for imaging by one or more sensors of aerial vehicle; determining one or more straight-line segments covering the geographical area based on at least one of: a desired image resolution and a desired overlap; determining one or more waypoints located at an end of each determined straight-line segment, where each waypoint comprises a geographical location, an altitude, and a direction of travel; determining one or more turnarounds connecting each of the straight-line segments, where each turnaround comprises one or more connecting segments, where the one or more connecting segments comprises at least one of: one or more arcuate segments and one or more straight-line connectors, and where the one or more connecting segments are based on the aerial vehicle characteristics; determining a path from a take-off location of the aerial vehicle to a first waypoint of the one or more waypoints; determining a path from a last waypoint of the one or more waypoints to a landing location of the aerial vehicle; and generating a flight plan for the aerial vehicle comprising: the determined path from the take-off location of the aerial vehicle to the first waypoint, the determined one or more straight-line segments, the determined one or more turnarounds connecting each straight-line segment, and the determined path from the last waypoint to the landing location of the aerial vehicle.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Figure 1:
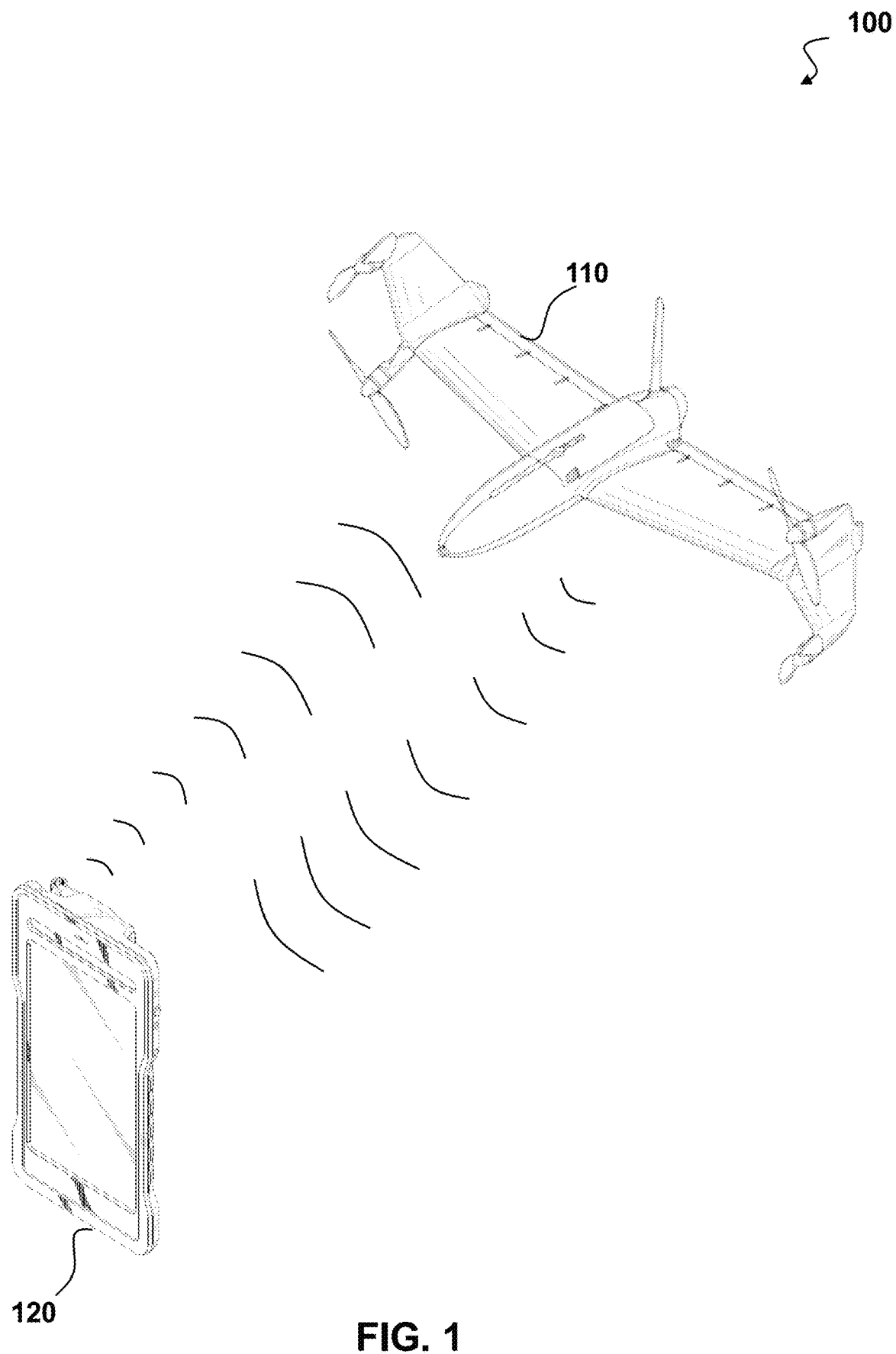
FIG. 1 depicts an air vehicle system having an aerial vehicle controlled by a ground control station.

The present system allows for the creation of a flight path for an aerial vehicle imaging a geographical area. Straight-line segments cover the geographical area to be imaged. One or more waypoints are located at the end of each straight-line segment. Each waypoint contains a geographical location, an altitude, and a direction of travel. The direction of travel is the direction the aerial vehicle will be traveling when the aerial vehicle passes through the waypoint. One or more turnarounds connect the straight-line segments together. The turnarounds comprise arcuate segments and/or straight-line portions. By providing a direction of travel and turnarounds, the disclosed system ensures that the aerial vehicle is substantially in-line with each straight-line segment, that overshoot is eliminated, and the entire geographical area is imaged at a high resolution, with a desired overlap, and with minimal errors.

The disclosed UAV has control systems allowing for automated operation. In such automated systems, waypoints may be programmed into the flight system by a user to direct the UAV where to fly. The waypoints may be a point in space, or a map location such as longitude and latitude, with an altitude associated therewith. Once programmed, the waypoints may then be set in an order to be flown to. However, the UAV cannot immediately change direction upon crossing a waypoint. For example, once a UAV reaches a first waypoint it may have to turn to change direction to reach the second waypoint, which may result in an overshoot. This overshoot may occur each time a waypoint is crossed. As such, the use of successive waypoints may cause an uneven and potentially inefficient operation of the UAV. Using additional waypoints may reduce some adverse effects, but increasing the number of waypoints adds significant workload and complexity to the setup and preparation of the flight.

In many embodiments, the method comprises receiving geometry data representing a geographical area for flyover by a vertical take-off and landing (VTOL) aerial vehicle, determining a plurality of flight segments for flying over the geographical area, where at least one flight segment is based on the geometry data and vehicle characteristics, determining a flight plan for the vehicle based on the plurality flight segments, and initiating the vehicle flight plan. In a number of embodiments, the plurality of flight segments may include arcuate flight paths where each flight path is based on vehicle speed and altitude. In additional embodiments, the method may further include acquiring flight conditions over the geographical area, and updating the flight plan based on the acquired flight conditions. In further embodiments, the acquired flight conditions may include one or more of wind speed, current VTOL aerial vehicle battery level, and determined physical obstacles. In several embodiments, the vehicle characteristics may include at least one of a VTOL aerial vehicle weight, a current VTOL aerial vehicle battery level, and pre-determined maneuverability characteristics of the VTOL aerial vehicle.

FIG. 1 depicts an air vehicle system 100 having an aerial vehicle 110 controlled by a ground control station 120. The aerial vehicle 100 is shown in FIG. 1 in a horizontal orientation, such as it would be positioned during forward flight. The ground control station (GCS) 120 can operate the aerial vehicle 100 motors via an onboard control system. Operation of the motors can apply both forces and torque to the aerial vehicle 100. In many embodiments, the GCS can communicate with the aerial vehicle 100 to determine a flight plan for a given ground area based on an input into the GCS by a user. Flight plans may include a continuous route that allows the aerial vehicle 100 to cover an entire defined geographical area with camera and/or sensor coverage. In a number of embodiments, the flight plans comprise flight segments sequentially arranged to facilitate the aerial vehicle 100 to cover the entire geographical area entered by a user on the GCS 120.

In several embodiments, the flight segments are arcuate flight paths of a defined height and speed. In additional embodiments, a flight segment may consist of a series of data points including, but not limited to, a starting point, an end point, a segment identification number, and a segment type identification. In still additional embodiments, the starting and/or end points comprise longitude and latitude points, as well as an altitude. In still yet additional embodiments, the starting and/or ending points may also include desired speed markers indicating the speed the aerial vehicle should be traveling when the start and/or end point is reached. In further embodiments, a starting and/or end point may be one of many types including, but not limited to, straight-line, arcuate, take-off, orientation transition, hover, or landing. In still further embodiments, the flight segment may also include a binary flag that indicates if the aerial vehicle should be imaging during the flight segment. In still yet further embodiments, flight segments may also contain an indication of a set of control laws to follow based on other data. By way of example, and not limitation, a control law may be implemented that limits the rolling of an aerial vehicle while imaging is occurring. In still yet additional embodiments, arcuate flight segments can be defined by a series of three points that can indicate a radius, center, and travel direction (clockwise or counter-clockwise). In still yet additional embodiments again, the three points defining an arcuate flight segment may indicate a starting point, ending point, and middle point of the arcuate flight path.

Figure 2:
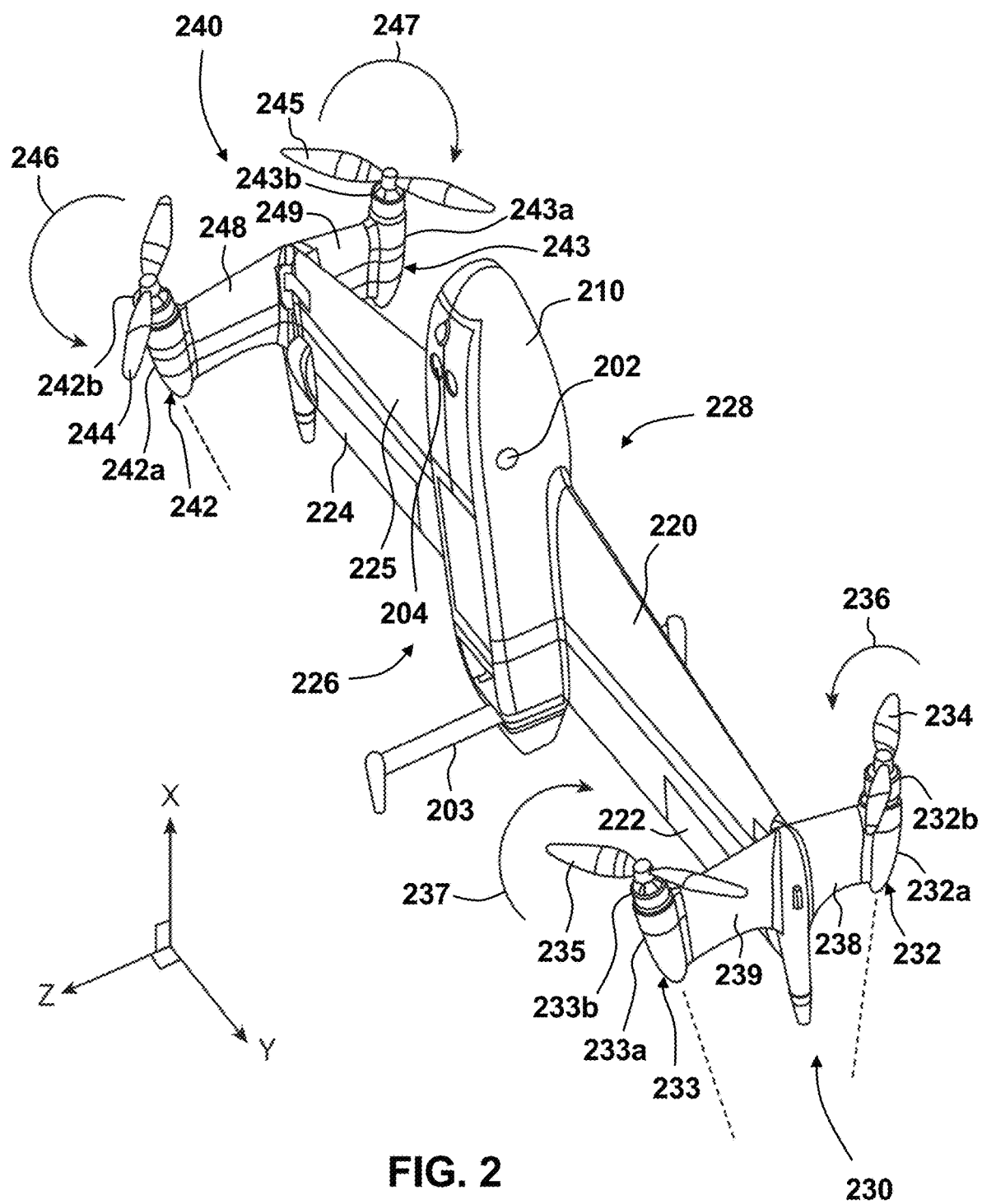
FIG. 2 depicts a perspective view of an embodiment of a vertical take-off and landing (VTOL) aerial vehicle.

FIG. 2 depicts a perspective view of an embodiment of a vertical take-off and landing (VTOL) aerial vehicle 200. The aerial vehicle 200 may be capable of vertical take-off and landing, hovering, vertical flight, maneuvering in a vertical orientation, transitioning between vertical and horizontal flight, and maneuvering in a horizontal orientation during forward flight. The aerial vehicle 200 may be controlled by an onboard control system that adjusts thrust to each of the motors 232b, 233b, 242b, 243b and control surfaces 222, 224. The onboard control system may include a processor having addressable memory and may apply differential thrust of the motors 232b, 233b, 242b, 243b to apply both forces and torque to the aerial vehicle 200.

The aerial vehicle 200 includes a fuselage 210 and a wing 220 extending from both sides of the fuselage 210. The wing 220 may include control surfaces 222, 224 positioned on either side of the fuselage 210. In some embodiments, the wing 220 may not include any control surfaces to reduce weight and complexity. A top side or first side 228 of the wing 220 may be oriented upwards relative to the ground during horizontal flight. A bottom side or second side 226 of the wing 220 may be oriented downwards relative to the ground during horizontal flight. The wing 220 is positioned in and/or about a wing plane 225. The wing plane 225 may be parallel to an x-y plane defined by the x-y-z coordinate system as shown in FIG. 2, where the x-direction is towards a longitudinal axis of aerial vehicle 200 and the y-direction is towards a direction out along the wing 220. The wing 220 may generally lie and/or align to the wing plane 225. In some embodiments, the wing 220 may define or otherwise have a planform of the wing that defines a plane that the wing is positioned at least symmetrically about.

One or more sensors 204 may be disposed in the fuselage 210 of the aerial vehicle 200 on the second side 226 to capture data during horizontal forward flight. The sensor 204 may be a camera, and any images captured during flight of the aerial vehicle 200 may be stored and/or transmitted to an external device. The sensor 204 may be fixed or pivotable relative to the fuselage 210 of the aerial vehicle 200. In some embodiments, the sensors 204 may be swapped based on the needs of a mission, such as replacing a LIDAR with an infrared camera for nighttime flights. In a number of embodiments, the sensors 204 may be capable of acquiring data that allows for a three-hundred-sixty-degree view of the surroundings of the aerial vehicle 200.

The aerial vehicle 200 is depicted in a vertical orientation, as it would be positioned on the ground prior to take-off or after landing. Landing gear 203 may maintain the aerial vehicle 200 in this vertical orientation. In some embodiments, the landing gear 203 may act as a vertical stabilizer during horizontal forward flight of the aerial vehicle 200.

A first motor assembly 230 is disposed at a first end or tip of the wing 220 distal from the fuselage 210. The first motor assembly 230 includes a pair of motor pods 232, 233 including pod structures 232a, 233a and motors 232b, 233b; winglets 238, 239; and propellers 234, 235. A top port motor pod 232 may include a top port pod structure 232a supporting a top port motor 232b. A rotor or propeller 234 may be driven by the top port motor 232b to provide thrust for the aerial vehicle 200. The top port motor pod 232 may be disposed on the first side 228 of the wing 220 and may be separated from the first end of the wing 220 by a spacer or winglet 238. The motor 232b applies a moment or torque on the propeller 234 to rotate it and in so doing applies an opposing moment or torque 236 on the aerial vehicle 200. The opposing moment 236 acts to rotate or urge the aerial vehicle 200 to rotate about its center of mass 202. The moment 236 may change in conjunction with the speed of the propeller 234 and as the propeller 234 is accelerated or decelerated. The propeller 234 may be a fixed or variable pitch propeller.

The angling of the axis of rotation of the motor 232b and propeller 234 from the vertical, but aligned with the plane of the winglet 238 and/or with a plane perpendicular to the wing plane 225, provides for a component of the thrust generated by the operation of the propeller 234 to be vertical, in the x-direction, and another component of the thrust to be perpendicular to the wing 220, in the negative z-direction. This perpendicular component of the thrust may act upon a moment arm along the wing 220 to the center of mass 202 of the aerial vehicle 200 to impart a moment to cause, or at least urge, the aerial vehicle 200 to rotate about its vertical axis when the aerial vehicle 200 is in vertical flight, and to roll about the horizontal axis when the aircraft is in forward horizontal flight. In some embodiments, this component of thrust perpendicular to the wing 220, or the negative z-direction, may also be applied in a position at the propeller 234 that is displaced a distance from the center of mass 202 of the aircraft 200, such as to apply a moment to the aerial vehicle 200 to cause, or at least urge, the aerial vehicle 200 to pitch about its center of mass 202. This pitching may cause, or at least facilitate, the transition of aerial vehicle 200 from vertical flight to horizontal flight, and from horizontal flight to vertical flight.

A bottom port motor pod 233 may include a bottom port pod structure 233a supporting a bottom port motor 233b. The bottom port motor 233b is disposed on the second side 226 of the wing 220 opposing the top port motor 232b. A rotor or propeller 235 may be driven by the bottom port motor 233b to provide thrust for the aerial vehicle 200. The bottom port motor pod 233 may be disposed on the second side 226 of the wing 220 and may be separated from the first end of the wing 220 by a spacer or winglet 239.

The motor 233b applies a moment or torque on the propeller 235 to rotate it and in so doing applies an opposing moment or torque 237 on the aerial vehicle 200. The opposing moment 237 acts to rotate or urge the aerial vehicle 200 to rotate about its center of mass 202. The moment 237 may change in conjunction with the speed of the propeller 235 and as the propeller 235 is accelerated or decelerated. The propeller 235 may be a fixed or variable pitch propeller.

The motor pod 233, the motor 233b, and the propeller 235 may all be aligned to be angled down in the direction of the second side 226 of the wing 220, down from the x-y plane in the z-direction, from the vertical while being within a plane of the winglet 239, such that any force, and force components thereof, generated by the propeller 235 shall align, and/or be within, the plane of the winglet 239, such that lateral forces to the plane of the winglet 239 are minimized or not generated. The alignment of the motor 233b and the propeller 235 may be a co-axial alignment of their respective axes of rotation.

The angle that the motor 233b and propeller 235 axes are from the vertical, x-direction may vary from 5 to 35 degrees. In one exemplary embodiment, the angle may be about 10 degrees from vertical. The angle of the motor 233b and propeller 235 axes may be determined by the desired lateral force component needed to provide sufficient yaw in vertical flight and/or sufficient roll in horizontal flight, such as that necessary to overcome wind effects on the wing 220. This angle may be minimized to maximize the vertical thrust component for vertical flight and the forward thrust component for horizontal flight.

The angling of the axis of rotation of the motor 233b and propeller 235 from the vertical, but aligned with the plane of the winglet 239 and/or with the plane perpendicular to the wing plane 225, provides for a component of the thrust generated by the operation of the propeller 235 to be vertical, in the x-direction, and another component of the thrust to be perpendicular to the wing 220, in the z-direction. This perpendicular component of the thrust may act upon a moment arm along the wing 220 to the center of mass 202 of the aerial vehicle 200 to impart a moment to cause, or at least urge, the aerial vehicle 200 to rotate about its vertical axis when the aerial vehicle 200 is in vertical flight, and to roll about the horizontal axis when the aircraft is in forward horizontal flight. In some embodiments, this component of thrust perpendicular to the wing 220, or the z-direction, may also be applied in a position at the propeller 235 that is displaced a distance from the center of mass 202 of the aircraft 200, such as to apply a moment to the aerial vehicle 200 to cause, or at least urge, the aerial vehicle 200 to pitch about its center of mass 202. This pitching may cause, or at least facilitate, the transition of aerial vehicle 200 from vertical flight to horizontal flight, and from horizontal flight to vertical flight.

A second motor assembly 240 is disposed at a second end or tip of the wing 220 distal from the fuselage 210 and distal from the first motor assembly 230. The second motor assembly 240 includes a pair of motor pods 242, 243 including pod structures 242a, 243a and motors 242b, 243b; winglets 248, 249; and propellers 244, 245. A top starboard motor pod 243 may include a top starboard pod structure 243a supporting a top starboard motor 243b. A rotor or propeller 245 may be driven by the top starboard motor 243b to provide thrust for the aerial vehicle 200. The top starboard motor pod 243 may be disposed on the first side 228 of the wing 220 and may be separated from the second end of the wing 220 by a spacer or winglet 249. The motor 243b applies a moment or torque on the propeller 245 to rotate it and in so doing applies an opposing moment or torque 247 on the aerial vehicle 200. The opposing moment 247 acts to rotate or urge the aerial vehicle 200 to rotate about its center of mass 202. The moment 247 may change in conjunction with the speed of the propeller 245 and as the propeller 245 is accelerated or decelerated. The propeller 245 may be a fixed or variable pitch propeller.

The motor pod 243, the motor 243b, and the propeller 245 may all be aligned to be angled up in the direction of the first side 228 of the wing 220, up from the x-y plane in the negative z-direction, from the vertical while being within a plane of the winglet 249, such that any force, and force components thereof, generated by the propeller 247 shall align, and/or be within, the plane of the winglet 249, such that lateral forces to the plane of the winglet 249 are minimized or not generated. The alignment of the motor 243b and the propeller 245 may be a co-axial alignment of their respective axes of rotation.

The angle that the motor 243b and propeller 245 axes are from the vertical, x-direction may vary from 5 to 35 degrees. In one exemplary embodiment, the angle may be about 10 degrees from vertical. The angle of the motor 243b and propeller 245 axes may be determined by the desired lateral force component needed to provide sufficient yaw in vertical flight and/or sufficient roll in horizontal flight, such as that necessary to overcome wind effects on the wing 220. This angle may be minimized to maximize the vertical thrust component for vertical flight and the forward thrust component for horizontal flight.

The angling of the axis of rotation of the motor 243b and propeller 245 from the vertical, but aligned with the plane of the winglet 249 and/or with the plane perpendicular to the wing plane 225, provides for a component of the thrust generated by the operation of the propeller 245 to be vertical, in the x-direction, and another component of the thrust to be perpendicular to the wing 220, in the negative z-direction. This perpendicular component of the thrust may act upon a moment arm along the wing 220 to the center of mass 202 of the aerial vehicle 200 to impart a moment to cause, or at least urge, the aerial vehicle 200 to rotate about its vertical axis when the aerial vehicle 200 is in vertical flight, and to roll about the horizontal axis when the aircraft is in forward horizontal flight. In some embodiments, this component of thrust perpendicular to the wing 220, or the negative z-direction, may also be applied in a position at the propeller 245 that is displaced a distance from the center of mass 202 of the aircraft 200, such as to apply a moment to the aerial vehicle 200 to cause, or at least urge, the aerial vehicle 200 to pitch about its center of mass 202. This pitching may cause, or at least facilitate, the transition of aerial vehicle 200 from vertical flight to horizontal flight, and from horizontal flight to vertical flight.

A bottom starboard motor pod 242 may include a bottom starboard pod structure 242a supporting a bottom starboard motor 242b. The bottom starboard motor 242b is disposed on the second side 226 of the wing 220 opposing the top starboard motor 243b. A rotor or propeller 244 may be driven by the bottom starboard motor 242b to provide thrust for the aerial vehicle 200. The bottom starboard motor pod 242 may be disposed on the second side 226 of the wing 220 and may be separated from the second end of the wing 220 by a spacer or winglet 248.

The motor pod 242, the motor 242b, and the propeller 244 may all be aligned to be angled down in the direction of the second side 226 of the wing 220, down from the x-y plane in the z-direction, from the vertical while being within a plane of the winglet 248, such that any force, and force components thereof, generated by the propeller 244 shall align, and/or be within, the plane of the winglet 248, such that lateral forces to the plane of the winglet 248 are minimized or not generated. The alignment of the motor 242b and the propeller 244 may be a co-axial alignment of their respective axes of rotation.

The angle that the motor 242b and propeller 244 axes are from the vertical, x-direction may vary from 5 to 35 degrees. In one exemplary embodiment, the angle may be about 10 degrees from vertical. The angle of the motor 242b and propeller 244 axes may be determined by the desired lateral force component needed to provide sufficient yaw in vertical flight and/or sufficient roll in horizontal flight, such as that necessary to overcome wind effects on the wing 220. This angle may be minimized to maximize the vertical thrust component for vertical flight and the forward thrust component for horizontal flight.

The motor 242b applies a moment or torque on the propeller 244 to rotate it and in so doing applies an opposing moment or torque 246 on the aerial vehicle 200. The opposing moment 246 acts to rotate or urge the aerial vehicle 200 to rotate about its center of mass 202. The moment 246 may change in conjunction with the speed of the propeller 244 and as the propeller 244 is accelerated or decelerated. The propeller 244 may be a fixed or variable pitch propeller.

The angling of the axis of rotation of the motor 242b and propeller 244 from the vertical, but aligned with the plane of the winglet 248 and/or with the plane perpendicular to the wing plane 225, provides for a component of the thrust generated by the operation of the propeller 244 to be vertical, in the x-direction, and another component of the thrust to be perpendicular to the wing 220, in the z-direction. This perpendicular component of the thrust may act upon a moment arm along the wing 220 to the center of mass 202 of the aerial vehicle 200 to impart a moment to cause, or at least urge, the aerial vehicle 200 to rotate about its vertical axis when the aerial vehicle 200 is in vertical flight, and to roll about the horizontal axis when the aircraft is in forward horizontal flight. In some embodiments, this component of thrust perpendicular to the wing 220, or the z-direction, may also be applied in a position at the propeller 244 that is displaced a distance from the center of mass 202 of the aircraft 200, such as to apply a moment to the aerial vehicle 200 to cause, or at least urge, the aerial vehicle 200 to pitch about its center of mass 202. This pitching may cause, or at least facilitate, the transition of aerial vehicle 200 from vertical flight to horizontal flight, and from horizontal flight to vertical flight.

The motors 232b, 233b, 242b, 243b operate such that variations in the thrust or rotation for fixed pitched rotors, and resulting torque or moment of pairs of the motors can create a resulting moment applied to the aerial vehicle 200 to move it in a controlled manner. Because of the angling off of the aircraft longitudinal centerline, vertical in hover and horizontal in forward horizontal flight, of each of the motors 232b, 233b, 242b, 243b, in addition to the moment imparted by the differential of the operation of the motors 232b, 233b, 242b, 243b a complementary force component is generated and applied to the aerial vehicle 200 to move it in the same manner.

Increasing thrust to the top two motors 232b, 243b, and decreasing thrust to the bottom two motors 233b, 242b in horizontal flight will cause the aerial vehicle 200 to pitch down. Decreasing thrust to the top two motors 232b, 243b, and increasing thrust to bottom two motors 233b, 242b in horizontal flight will cause the aerial vehicle 200 to pitch up. A differential between the thrust of the top two motors 232b, 243b and the bottom two motors 233b, 242b may be used to control the pitch of the aerial vehicle 200 during horizontal flight. In some embodiments, control surfaces 222, 224 on the wing 220 may also be used to supplement pitch control of the aerial vehicle 200. The separation of the top and bottom motors by their respective winglets is needed to create the pitch moment of the aerial vehicle 200.

Increasing thrust to the top port motor 232b and bottom starboard motor 242b, and decreasing thrust to the top starboard motor 243b and bottom port motor 233b in horizontal flight will cause the aerial vehicle 200 to roll clockwise relative to a rear view of the aerial vehicle 200. Decreasing thrust to top port motor 232b and bottom starboard motor 242b, and increasing thrust to the top starboard motor 243b and bottom port motor 233b in horizontal flight will cause the aerial vehicle 200 to roll counter-clockwise relative to a rear view of the aerial vehicle 200. A differential between the thrust of the top port and bottom starboard motors and the top starboard and bottom port motors may be used to control the roll of the aerial vehicle 200 during horizontal flight. In some embodiments, control surfaces 222, 224 on the wing 220 may also be used to supplement roll control of the aerial vehicle 200.

Increasing thrust to both port motors 232b, 233b and decreasing thrust to both starboard motors 242b, 243b in horizontal flight will cause the aerial vehicle 200 to yaw towards starboard. Decreasing thrust to both port motors 232b, 233b and increasing thrust to both starboard motors 242b, 243b in horizontal flight will cause the aerial vehicle 200 to yaw towards port. A differential between the thrust of the top and bottom starboard motors 242b, 243b and the top and bottom port motors 232b, 233b may be used to control the yaw of the aerial vehicle 200 during horizontal flight.

Figure 3:
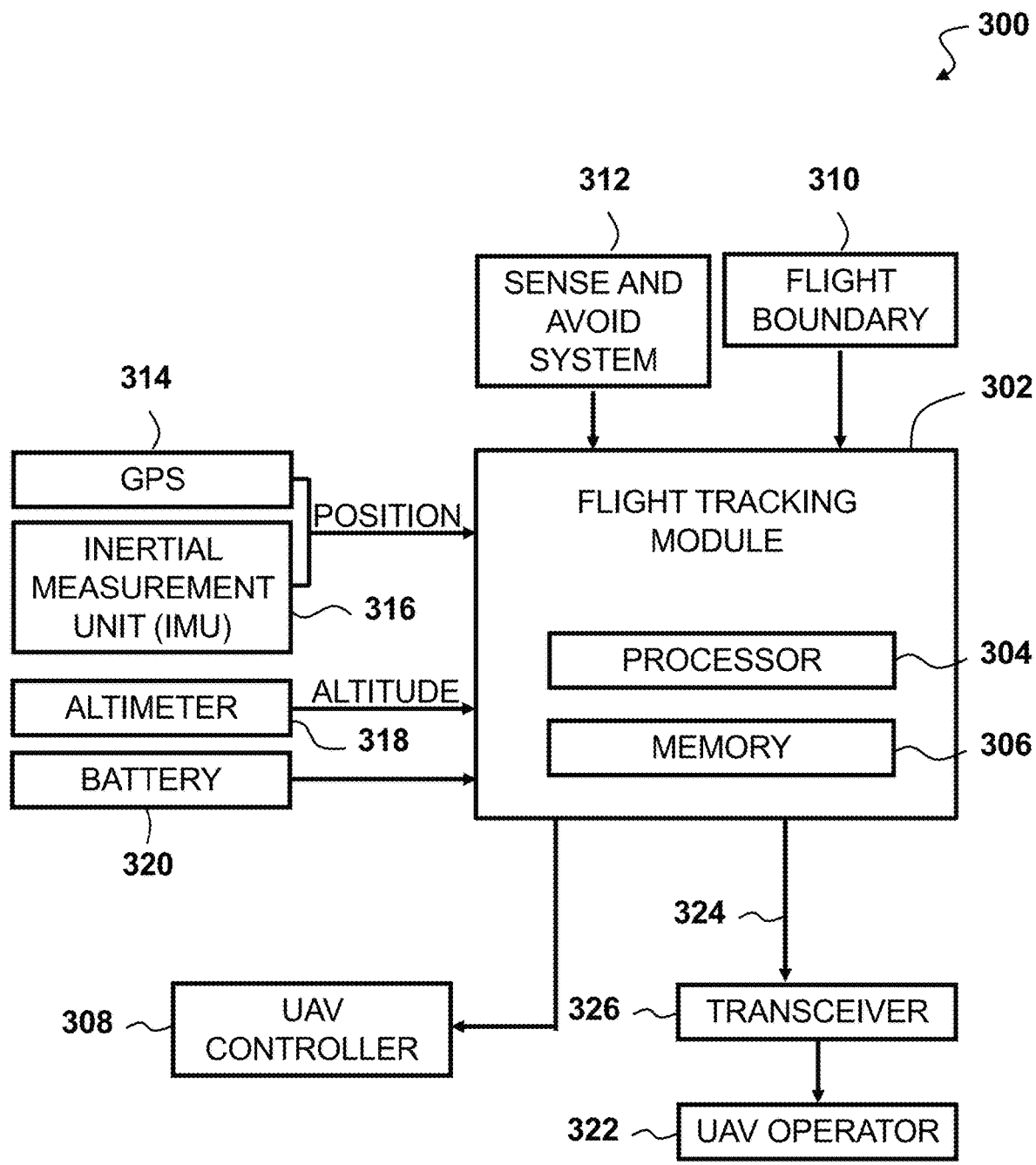
FIG. 3 depicts an exemplary flight-tracking module having a processor with addressable memory.

FIG. 3 depicts an exemplary flight tracking module having a processor with addressable memory 300. A flight-tracking module 302 may include a processor 304 and memory 306. The flight-tracking module 302 may be an independent device from a UAV controller 308, or integrated with the UAV controller 308. In still further embodiments, the ground control system may determine the flight plan that is then transferred to the UAV. In still yet further embodiments, the flight plan can be determined by a mobile computing device such as a cell phone or tablet and then transferred to the UAV. The degree of integration between the flight tracking module 302, UAV controller 308, inputs, and outputs may be varied based on the reliability of the system components. Having the flight-tracking module 302 separate from the UAV controller 308 provides the flight-tracking module 302 with ultimate supervisory control over the flight of the UAV across the flight plan.

The flight-tracking module 302 may receive an input defining a flight boundary 310. The flight boundary 310 may provide data defining a flight boundary of a UAV and/or airspace from which it is prohibited. The flight boundary 310 may be downloaded from an external source, e.g., a geofence from a third-party server, and stored in the flight tracking module 302 memory 306. The flight boundary 310 may be loaded prior to a UAV takeoff and/or dynamically updated during flight, e.g., due to changing conditions and/or updated flight boundaries. In some embodiments, the flight boundary 310 may be preloaded in the memory 306.

The flight-tracking module 302 may also receive an input from a sense and avoid system 312. The sense and avoid system 312 may be a radar, a sonar, an optical sensor, and/or LIDAR system. The sense and avoid system 312 may provide information on any objects that could collide and/or otherwise interfere with the operation of the UAV, e.g., towers, tall trees, and/or other aircraft. The sense and avoid system 312 may also receive inputs from other aircraft, e.g., a signal from an emergency vehicle notifying aircraft to not enter airspace due to firefighting activities. The sense and avoid system 312 and flight boundary 310 inputs may be used by the flight tracking module 302 to update the flight plan based on these changing conditions.

The flight-tracking module 302 may also receive input from a global positioning system (GPS) 314 and an inertial measurement unit (IMU) 316 to determine the UAV position. An altimeter 318 input may be used by the flight-tracking module 302 to determine the UAV altitude. The GPS 314, IMU 316, and altimeter 318 may be separate and/or redundant devices that only provide input to the flight-tracking module 302. In some embodiments, the GPS 314, IMU 316, and/or altimeter 318 may be used by both the flight tracking module 302 and the UAV controller 308. In some embodiments, the flight-tracking module 302 may pass through one or more inputs received (310, 312, 314, 316, 318) to the UAV controller 308 as a backup, if a corresponding device in the UAV fails, and/or for primary use due to higher system integrity of the device input being received by the flight-tracking module 302. In some embodiments, the inputs received (310, 312, 314, 316, 318) may be stored in the flight-tracking module 302 memory 306 as a "black box" recording of UAV flight data.

A battery 320 may be used to power the flight-tracking module 302. The position inputs (314, 316) and altitude input 318 may be used in combination with the flight boundary input 310 and sense and avoid system input 312 to determine, by the processor 304 of the flight tracking module 302, the determined flight plan given the desired coverage area and/or flight geometry as determined by the UAV controller 308 and/or UAV operator 322.

The flight plan may be dynamic and offer a UAV operator 322 and/or a UAV autopilot of the UAV controller 308 a chance to better optimize the UAV trajectory based on prior or subsequently acquired data. The flight-tracking controller 302 may send a status signal 324, via a transceiver 326, to the UAV operator 322. The UAV operator 322 may use a UAV operator controller having a UAV operator controller processor having addressable memory. The UAV controller processor may receive a status of the UAV, where the status may include data on at least one of: the UAV power source 320, the UAV controller 308, the UAV navigation device, the UAV radio, and the at least one propulsion device. The UAV controller processor may also receive a warning if the determined UAV flight plan needs to be adjusted based on newly acquired data.

Figure 4:
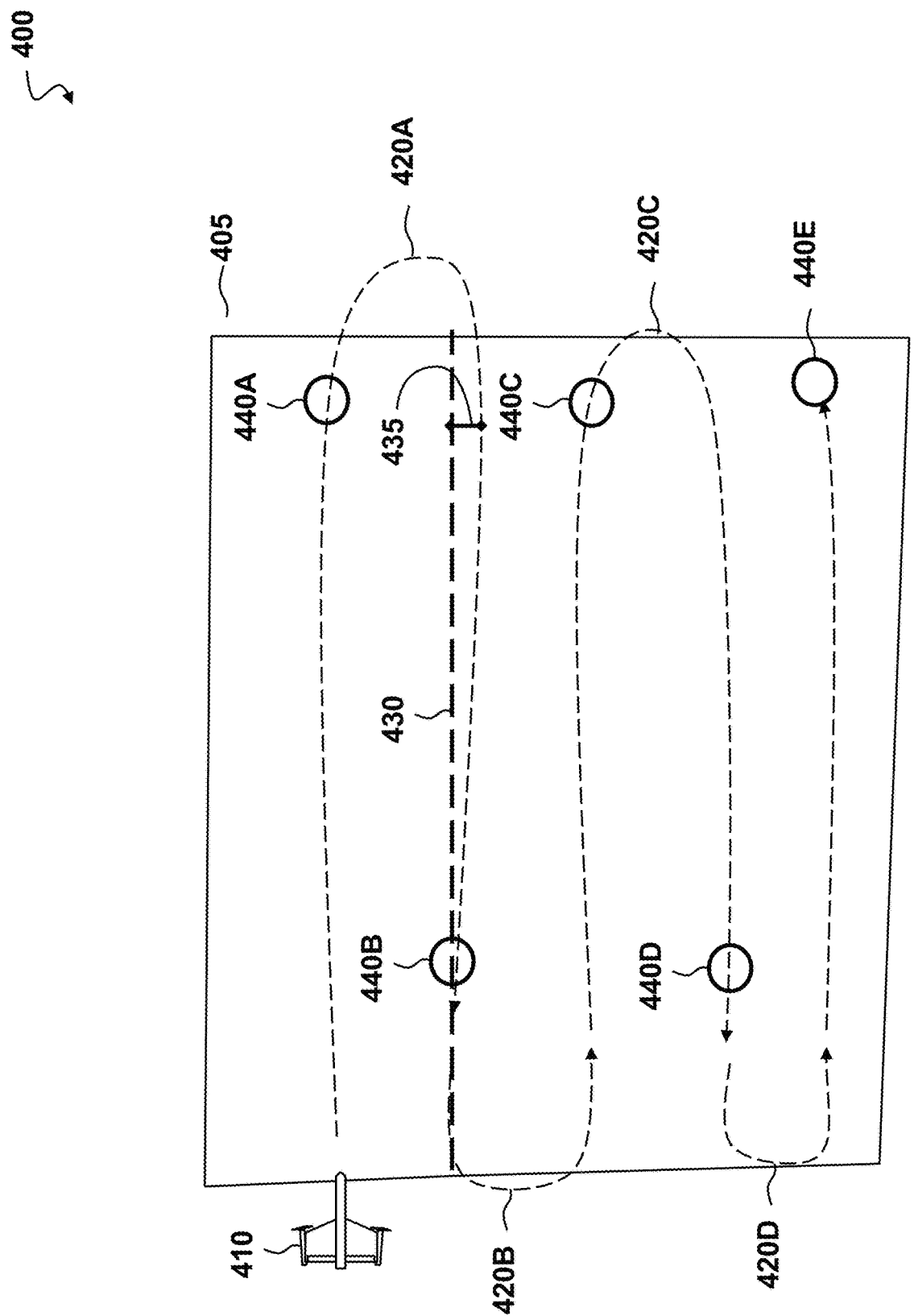
FIG. 4 depicts a conceptual illustration of a method 400 of UAV flight that is determined by waypoints.

FIG. 4 depicts a conceptual illustration of a method 400 of UAV flight that is determined by waypoints 440A, 440B, 440C, 440D, 440E. The flight plan of the UAV 410 is programmed such that the UAV 410 passes through each waypoint 440A, 440B, 440C, 440D, 440E in a pre-defined order. In this example, the UAV 410 may fly to a first waypoint 440A. In heading toward the initial waypoint 440A, the UAV 410 does not take any other waypoint or location geometry into account, such as the field geometry of the geographical area 405 being covered. The UAV 410 begins a process of flying from the UAV's 410 current location to the first waypoint 440A. Upon completion of travel to the first waypoint 440A, the UAV 410 then evaluates the location of the second waypoint 440B. Upon determination of the location of the second waypoint 440B, the UAV 410 may attempt to create the shortest route between its current position and that of the second waypoint 440B.

In some embodiments, this creates a situation wherein the UAV 410 may make a narrow turn, which may cause the UAV 410 to expend more energy and yield a less energy-efficient route. In other embodiments, the UAV 410 may make a sub-optimal turn 420A due to the vehicle characteristics. This suboptimal turn 420A may create an offset 435 from a desired path of sensing 430. This can cause a portion of the geographical area 405 to not be captured by the UAV 410 sensors. Likewise, when the UAV 410 reaches the second waypoint 440B, the third waypoint 440C is determined as the next location to fly towards. This causes a second sub-optimal turn 420B to the next waypoint 440C. This second sub-optimal turn 420B may potentially create additional portions of the geographical area 405 that are not captured by the UAV 410 sensors. This process repeats when the third waypoint 440C is reached and the fourth waypoint 440D is utilized, causing a third sub-optimal turn 420C. Once the fourth waypoint 440D is reached and the final waypoint 440E is determined, a fourth sub-optimal turn 420D may be made by the UAV 410.

The UAV 410 requires consistent images from the UAV sensors in order to create data that may be used for review and/or analysis, and each sub-optimal turn 420A, 420B, 420C, 420D may create inconsistencies that may result in lower image quality, errors in analysis, or the like. In some embodiments, the UAV 410 attempts to create the shortest route between its current position and that of the next waypoint. In many instances, this creates a situation wherein the UAV may attempt a turn that is too small for its minimum turn radius, resulting in the UAV drifting off of a straight-line course over the land to be covered. The UAV can then correct its course, resulting in the offset 435 from the straight-line course 430. In many embodiments, this offset 435 may result in an area of the land area not being captured by the sensors on the UAV. In a number of embodiments, the number and location of the waypoints 440A, 440B, 440C, 440D, 440E over the geographical area 405 to be imaged may result in multiple offsets.

Figure 5:
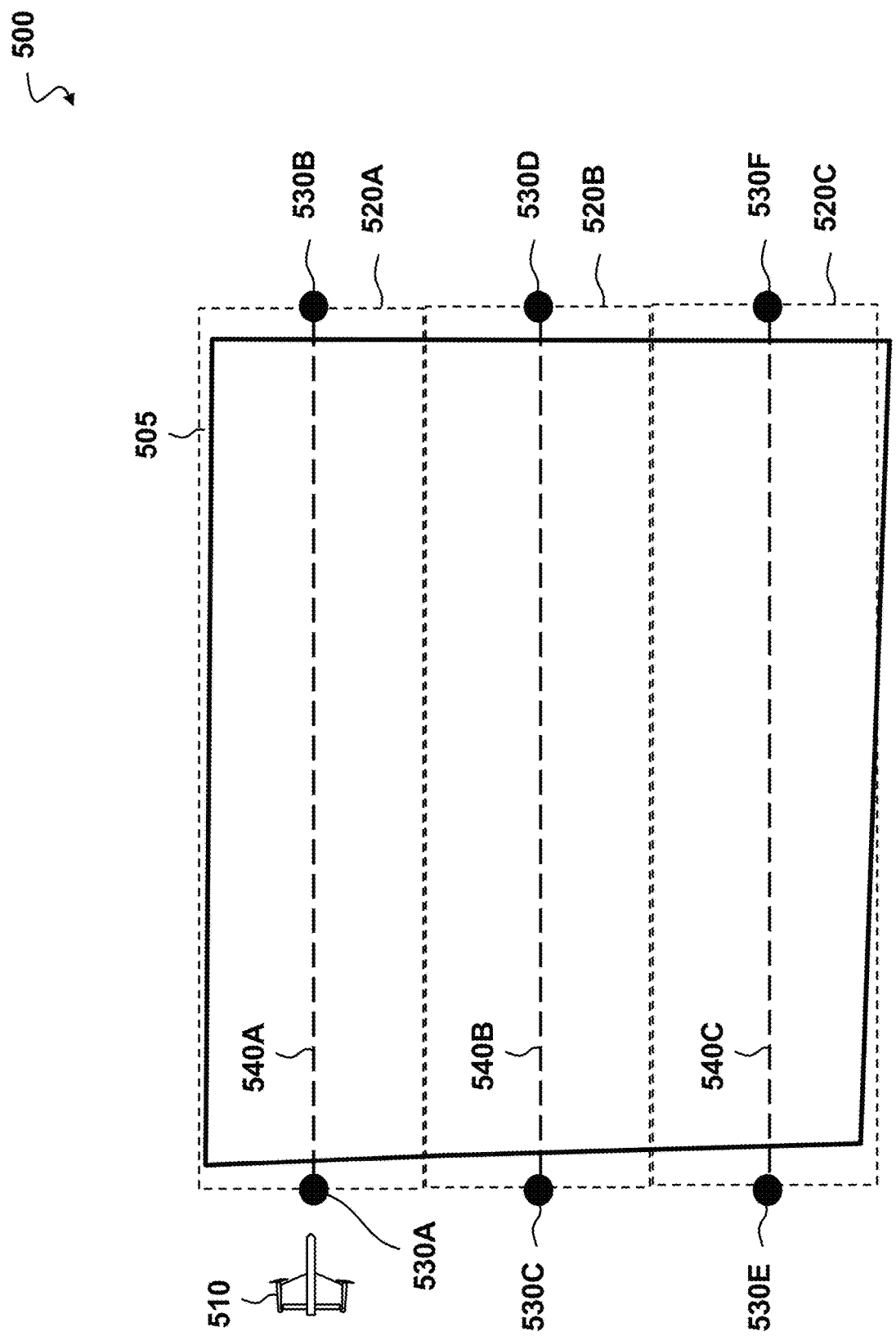
FIG. 5 depicts a conceptual illustration of determining straight-line flight segments of an energy-efficient flight plan in accordance with an embodiment of the invention.

FIG. 5 depicts a conceptual illustration of determining straight-line flight segments of an energy-efficient flight plan in accordance with an embodiment of the invention. In many embodiments, the flight plan determination 500 may be accomplished by evaluating the geographical area 505 to be imaged by the UAV 510 sensors. The UAV 510 may have a determined area of sensor capabilities, which can be represented by a width of coverage. In a number of embodiments, the determination can be accomplished by overlaying a series of sensor-area rectangles 520A, 520B, 520C on the land 505 area that correspond to the area of land 505 that would be covered by the UAV 510 sensors if the UAV 510 flies a series of straight lines 540A, 540B, 540C across the land 505. In many embodiments, each sensor-area rectangle 520A, 520B, 520C may have significant overlap, as shown in FIG. 10C, to allow for stitching the images together, but is represented here as adjoining rectangles for the purposes of illustration. In some embodiments, the sensor-area rectangles 520A, 520B, 520C may be overlaid in a manner that attempts to minimize the amount of land 505 that is covered twice, while attempting to ensure that the entire area of the land 505 is covered by the UAV 510 sensors in at least one pass. In additional embodiments, the sensor-area rectangles 520A, 520B, 520C may be generated by first determining a UAV 510 starting point 530A and ending point 530B, generating a straight-line 540A between the two points 530A, 530B and generating a sensor-area rectangle 520A width by correlating the width of the sensor-area rectangle 520A with the width or distance of the sensor capabilities of the UAV 510. Likewise, in still additional embodiments, sensor-area rectangles 520B, 520C may be determined by evaluating the UAV 510 starting points 530A, 530C, 530E and end points 530B, 530D, 530F and generating straight lines 540A, 540B, 540C between the respective point pairs 530A, 530B, 530C, 530D, 530E, 540F. In further embodiments, determined starting and end points of sensor-area rectangles 520A, 520B, 520C may be interchangeable, i.e. starting points may be used as end points and vice-versa depending on the application. In further additional embodiments, starting and end points 530A, 530B, 530C, 530D, 530E, 540F may be evaluated by the UAV system for connection via additional straight lines and/or arcuate paths in order to create a linear, unitary flight plan that covers the entire land 505 area. The flight path may also include take-off and landing to and/or from the starting and end points 530A, 530B, 530C, 530D, 530E, 540F.

Figure 6:
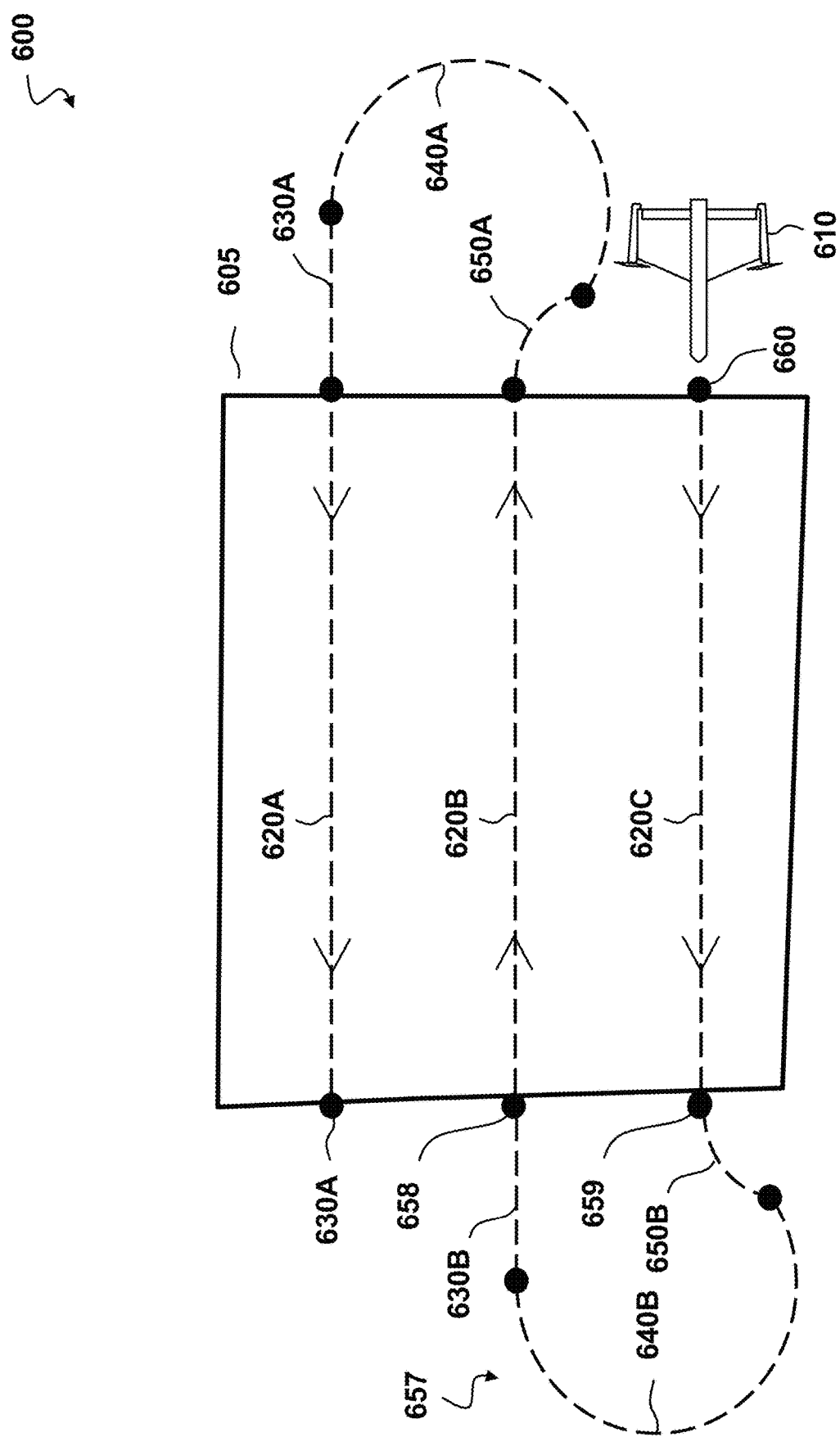
FIG. 6 depicts a conceptual illustration of generating flight segments that can connect to form an energy-efficient flight plan in accordance with an embodiment of the invention.

FIG. 6 depicts a conceptual illustration of generating flight segments that can connect to form an energy-efficient flight plan in accordance with an embodiment of the invention. The flight segment generation process 600 can include evaluating a series of straight lines 620A, 620B, 620C that are determined to allow sensor coverage of the entire geographical area 605 by the one or more sensors of the UAV 610. Additionally, in certain embodiments, a starting point 660 can be evaluated as a launching point for the UAV 610. The UAV system may generate a series of potential lines and/or arcuate paths that the UAV 610 is capable of flying. In additional embodiments, the potential lines and/or arcuate paths can be provided by an external source such as, but not limited to, a library of flight segment shapes based on the characteristics of the UAV 610. In still additional embodiments, the potential lines and/or arcuate paths of the flight segments may have an associated length or overall energy expenditure associated with each corresponding shape. In further embodiments, the UAV system can generate a flight plan by connecting the starting points and end points of the straight-lines 620A, 620B, 620C such that only a starting point 6360 and end point 630A may have a single connection to other points and every other remaining point is limited to connections with two other points. In still further embodiments the flight plan may be generated with an additional goal of reducing the overall length and/or energy expenditure associated with the sum of the flight segments utilized.

Figure 12B:
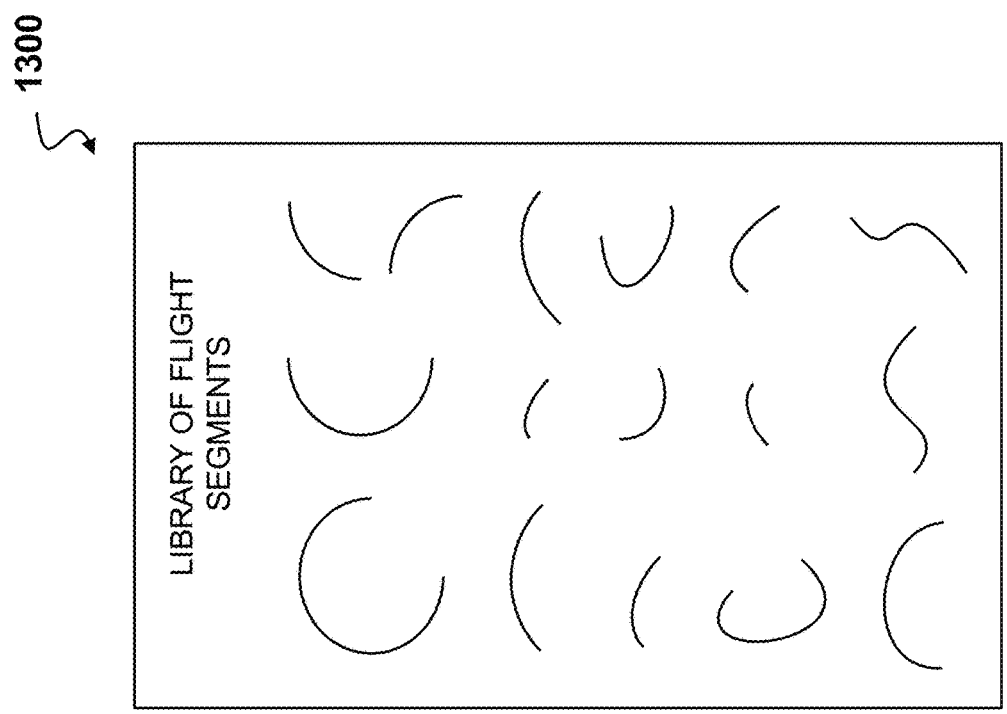
FIG. 12B depicts a library of flight segments used to construct the turnarounds connecting the straight-line segments in FIG. 12A.
Figure 12A:
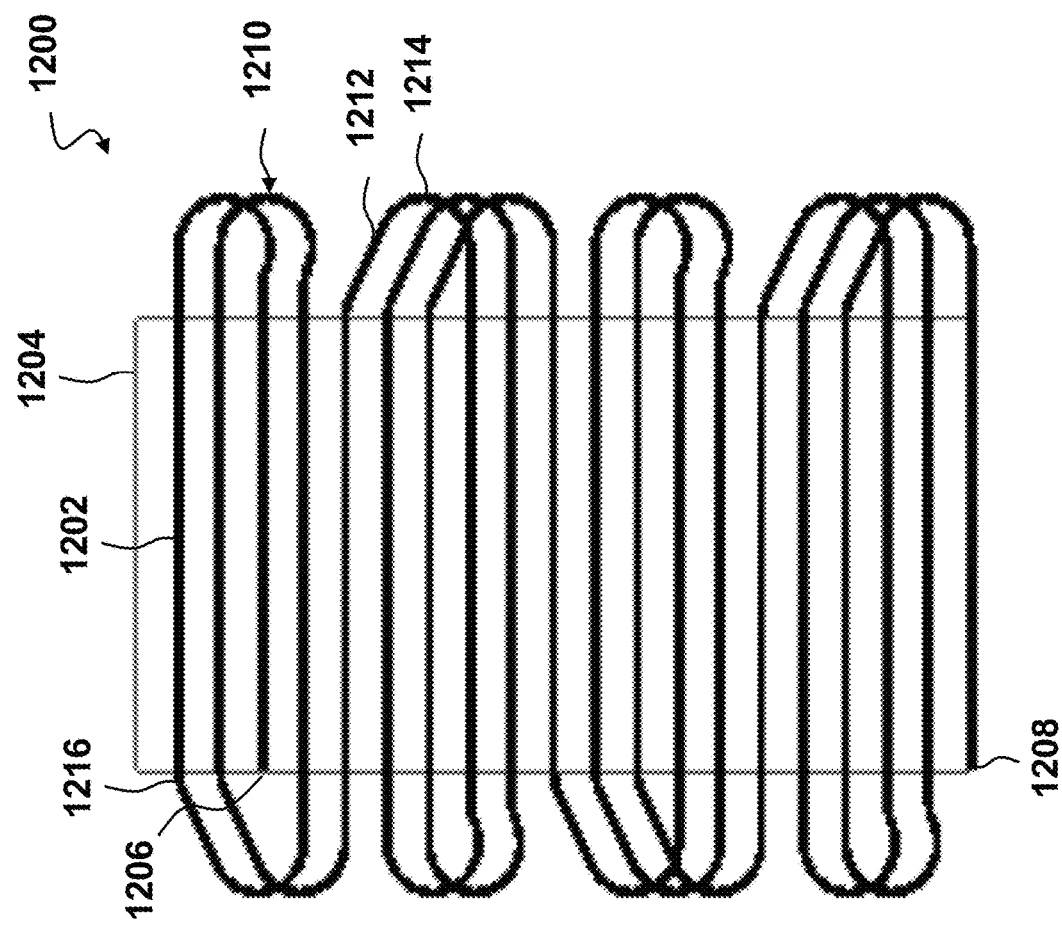
FIG. 12A depicts generating a flight path that connects straight-line segments covering a geographical area to be imaged.

By way of example, in certain embodiments, the flight segment generation process 600 may connect a starting point 660 and end point 630A by generating an arc 650B, 640B followed by a straight-line 630B that may allow the UAV 610 to turn in a matter such that the UAV 610 passes through each waypoint heading in the desired direction at the time the UAV 610 passes through the waypoint. In certain further embodiments, this process can repeat indefinitely until the entire geographical area 605 to be imaged is covered by the one or more sensors of the UAV 610. In still yet further embodiments, the type of curves and/or flight segments utilized may yield a flight path that skips sequential rows of sensor-area rectangles, instead completing the skipped rows later in the flight path, as shown in FIG. 12A. This may happen often when the turning radius of the UAV 610 is larger than the spacing of a single row of the sensor-area rectangles.

The UAV 610 take-off and landing locations may be within the geographical area 605 or outside of the geographical area 605. The UAV 610 may fly from its take-off location to a starting waypoint 660. The UAV 610 may fly from its ending waypoint to its landing location. The take-off location and landing location may be the same location or a different location. The flight path may be optimized so as to minimize the flight path distance including the time to go from the take-off location to the starting waypoint 660 and from the ending waypoint 630A to the landing location. In the example shown in FIG. 6, there are only three straight-line segments 620A, 620B, 620C shown, which results in the starting waypoint 660 being on an opposite side of the geographical area 605 from the ending waypoint 630A. In flight plans with more than three straight-line segments, the flight path may be optimized such that the starting waypoint and the ending waypoint are disposed proximate one another and/or disposed on a same side of the geographical area 605 to be imaged.

Each waypoint 660, 659, 658, 630A in the disclosed system includes a location, altitude, and direction. For example, the starting waypoint 660 may have a geographical location based on latitude and longitude coordinates. The starting waypoint 660 may also have an altitude. The altitude may be an elevation about mean sea level (MSL) and/or a ground elevation. For example, if the latitude and longitude location starting waypoint 660 is higher than other portions of the geographical area 605 to be imaged, then the elevation above MSL may be higher so that the distance from the one or more imagers of the UAV 610 to the ground remains substantially constant. In other embodiments, the altitude of the UAV 610 may remain at a substantially constant MSL regardless of changes in ground elevation.

The desired elevation may depend on the imager characteristics, the UAV characteristics, and/or any regulations. In one embodiment, the elevation may be about 100 meters. The elevation for each waypoint may be varied by a user or operator based on vehicle capabilities, the desired image quality, and the like.

The direction of the waypoint may be a direction the UAV 610 is traveling when the UAV passes through the waypoint. For example, in the starting waypoint 660 and waypoint 659 the direction of travel is substantially to the left. The direction for the waypoint ensures that the UAV 610 is not still turning when it passes through the waypoint. If a direction is not included, the UAV 610 may be likely to overshoot the desired straight-line segment 620C, such as shown in FIG. 4. In some embodiments, each waypoint may also include a speed marker. A speed marker is a set speed, or range of speed, that the UAV is traveling at when it passes through the waypoint. Certain speeds, or speed ranges may be needed to accomplish certain turns or maneuvers.

In the embodiment shown in FIG. 6, the UAV 610 exits straight-line segment 620C and passes through waypoint 659 at a set geographical location, altitude, and direction, where the direction is to the left of the sheet in the overhead view shown in FIG. 6. The UAV 610 needs to fly from waypoint 659 to waypoint 658 to image the next straight-line segment 620B. The connector between a first straight-line segment 620C and a next straight-line segment to be imaged is a turnaround 657. The turnaround 657 includes one or more connecting segments 650B, 640B, 630B. The one or more connecting segments 650B, 640B, 630B may include one or more arcuate segments 650B, 640B and/or one or more straight-line connectors 630B. The first arcuate segment 650B is a counterclockwise arcuate segment, which connects to a second arcuate segment 640B. The second arcuate segment 640B is a clockwise arcuate segment, which connects to a straight-line connector 630B.

Each arcuate segment 650B, 640B includes a radius, a center, and a travel direction. In some embodiments, each arcuate segment 650B, 640B may include a starting point, a middle point, and an end point, which can be used to obtain radius, center, and travel direction. Multiple arcuate segments 650, 640B, and/or straight-line connectors 630B may be combined to create a desired turnaround 657. As shown in FIG. 6, merely including a single arc would cause the UAV 610 to overshoot the straight-line segment 620B as the UAV 610 would not be able to pass through the waypoint 658 heading in a direction to the right of the sheet shown in FIG. 6. The turnaround 657 shown in FIG. 6 allows the UAV to pass through waypoint 659 heading to the left and pass through waypoint 658 heading to the right. The direction of the waypoint ensures that the UAV 610 is substantially on path with each straight-line segment 620B, 620C. The UAV 610 passes through a waypoint when exiting a straight-line segment that was imaged such that the waypoint direction is substantially in-line with the exited straight-line segment. The UAV 610 also passes through a waypoint when entering a straight-line segment to be imaged such that the waypoint direction is substantially in-line with the entered straight-line segment. These directions for the waypoints ensure that the UAV 610 is traveling in the right direction when passing through the waypoint, and not merely passing through the waypoint.

In some embodiments, each arcuate segment and/or straight-line connector may also include a change in altitude. When the UAV 610 is first taking off and before it reaches a final altitude, one or more arcuate segment and/or straight-line connectors may be used to gain altitude. In one embodiment, arcuate segments may be used such that the UAV 610 turns in an orbit. Each complete turn made by the UAV 610 when gaining altitude may be, for example, a 40-meter gain in altitude. Arcuate segments may allow the UAV 610 to gain or lose height. The benefit of using arcuate segments in horizontal flight is that it is more efficient than hovering in vertical flight to gain in altitude. In addition, using arcuate segments may allow the UAV 610 to stay within desired boundaries while gaining altitude.

Even if a number of rows need to be skipped or are not done sequentially, there may always be a linear, unitary flight path available to be generated. This may be demonstrated on 24 sample sensor-area rectangle "rows" using the following code from MATLAB® by The MathWorks, Inc. of Natick, MA to show that no rows are skipped or repeated:

```
a = [3,-2, 3,-2, 3];
b(1) = 1;
for i = 2:24
    ind = mod(i,length(a))+1;
    b(i) = b(i-1) + a(ind);
end
```

The following MATLAB® code states a generalized solution to embodiments wherein multiple sensor-area rectangle rows can be skipped due to the turning capabilities of the UAV. This code ensures that no rows are skipped or repeated. If rows are too close, then a buttonhook style turn may need to be used, such as shown in the turnaround in FIG. 6. However, if a row is skipped, then a more desirable turnaround may be used. In the pattern shown below, the row order may include skip three, go back two, skip three, go back two, skip three, skip three, go back tow, and so on.

```
clear all
n_min = 2; % min number of rows to skip
n_total = 50; % total number of rows to fly
% build the skip pattern – this pattern will be repeatedly followed
atmp = [n_min+1;-n_min];
a = [ ];
for i = 1:n_min
    a = [a ; atmp];
end
a = [a ; n_min + 1];
% build the row plan
b(1) = 1;
for i = 2:n_total
    a_i = a(mod(i-2,length(a))+1);
    b(i) = b(i-1) + a_i;
end
% plot
plot(b, '.-');
```

Figure 7:
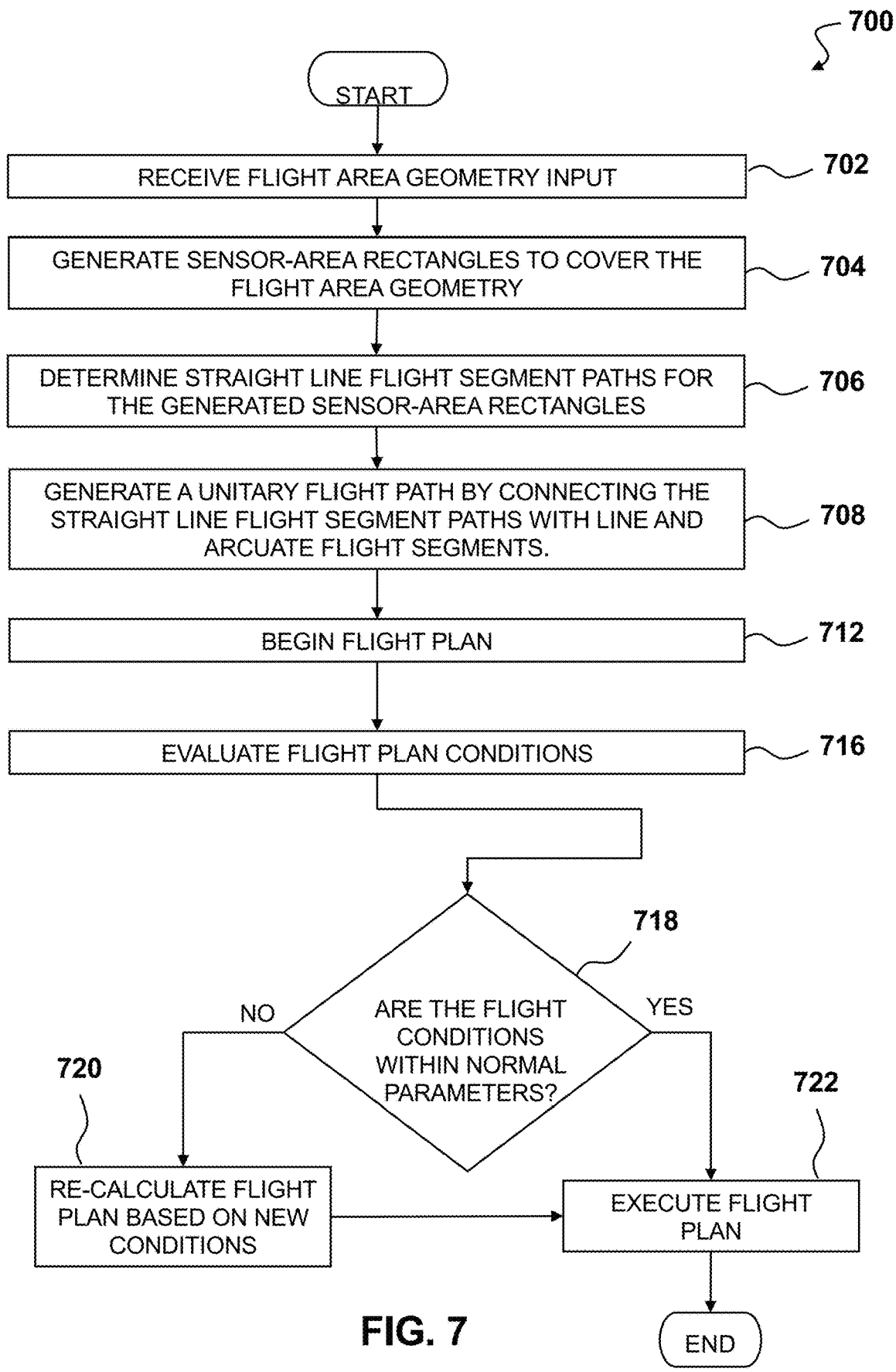
FIG. 7 depicts a process for determining a flight plan for VTOL aerial vehicles in accordance with an embodiment of the invention.

FIG. 7 depicts a process for determining a flight plan for VTOL aerial vehicles in accordance with an embodiment of the invention. The process 700 includes receiving flight area geometry input (step 702). In some embodiments, the received flight area geometry is obtained from a user selecting an area to be flown over via a ground control station unit. In certain embodiments, the flight area geometry can be pre-programmed or obtained from a network connection prior to flight. In certain embodiments, flight area geometry is composed of latitude and longitude points. In certain further embodiments, a UAV operator may determine a flight area by drawing a picture of the desired area on a map and the latitude and longitude points are dynamically determined based on the operator drawing. In still further embodiments, the altitude or other elevation data may be pre-programmed and automatically accounted for in the flight plan without the need for operator input to account for variances in elevation over the flight area. In this manner, a flight plan can be determined and/or validated as feasible prior to launch.

In additional embodiments, once flight area geometry is known, the process 700 can generate one or more sensor-area rectangles to cover the received flight geometry (step 704). In still additional embodiments, the sensor-area rectangles can be generated based on the size of the received geometry input area and the sensing capabilities of the UAV.

In still yet further embodiments, the process 700 can determine a straight-line flight segment path for each of the generated sensor-area rectangles (step 706). In some embodiments, the process 700 may involve determining the straight-line segments prior to the sensor-area rectangles. In further additional embodiments, the process 700 can generate a unitary flight path from the determined straight-line flight segment paths together with other straight-line and/or arcuate flight segments (step 708). In numerous embodiments, the characteristics of the UAV may be accounted for when determining available UAV flight segments, which may include, but is not limited to, effective turning radius, weight, current battery levels, and/or camera/sensor coverage area. In several embodiments, the determined flight plan may be an optimized flight plan. In still further embodiments, the flight plan may be determined to be more optimized through an evaluation of many factors, including, but not limited to consecutive row spacing, the minimum turn radius of the air vehicle, the length of the entire flight plan, and/or known weather conditions. In still yet additional embodiments, the flight plan may be determined based upon the minimum flight radius of the aerial vehicle such that the flight plan avoids turns that are not capable and/or energy efficient for the aerial vehicle. In many embodiments, processes for determining the flight plan for a given flight area geometry may include utilizing pre-defined flight segments. In a number of embodiments, a flight plan can be composed of flight segments, which are themselves arcuate flight paths composed of lines and arcs within aerial space sequenced together to cover the determined flight area geometry. In further embodiments, the flight segments may include location, speed, and altitude markers for the UAV. In yet further embodiments, the UAV system may utilize software to error-check and/or smooth out consecutive flight segments to conform to the flight capabilities of the UAV. In this way, the generated unitary flight path together with other included data may make up the flight plan. In numerous embodiments, the flight plan can begin once the unitary flight path is generated (step 712).

During the course of executing the flight plan, certain embodiments of the UAV system may evaluate the current flight plan conditions (step 716). If it is determined that the current flight conditions are within normal parameters (step 718), then the flight plan can continue to be executed (step 722).

However, in still further embodiments, if flight conditions are determined to not be within normal parameters (step 718), then the flight plan is re-calculated based on the new flight conditions (step 720). The new conditions may include a command or desire to look at a new geographical area. For example, a priority may change and the flight plan may be updated to commence a new mission or image a new geographical area. Bidirectional reflectance distribution (BRDF) may cause half of an image captured by the aerial vehicle to be darker than the other half of the image due to the direction of the sun relative to the aerial vehicle and the flight plan. BRDF may be reduced by a re-calculated flight plan where the aerial vehicle may fly a new flight plan, e.g., a flight plan that is substantially perpendicular to the direction of the sun. Any changes to the flight plan or a re-calculation of the flight plan may be automatic and/or may provide a prompt to a user or operator of the aerial vehicle. The user or operator could confirm the new flight plan does not cause any issues, such as flying over a certain geographical location or flying too close to an obstacle.

In some embodiments, the flight plan may provide an adjustment in the speed of the aerial vehicle. For example, if a storm is expected to arrive before the flight plan is completed, the user or operator may decide to sacrifice image quality for having the flight plan completed prior to the storm arriving and sooner than the original ending estimate. As another example, the flight plan may be modified such that the aerial vehicle flies at a faster rate of speed over certain areas to be imaged and slower over other areas to be imaged. An area of concern, such as crops exhibiting damage, may be imaged with a slower rate of speed to ensure accuracy for any scientific analysis of the images while areas without concern may be imaged at a higher rate of speed. If any areas of concern are detected in the areas imaged at a higher rate of speed a new flight plan, or a modified flight plan, may be constructed to obtain higher quality images of those new areas of concern. In some embodiments, the flight plan may fly at a lower altitude to obtain a high-resolution collect. In other embodiments, the flight plan may change elevation in flight if a resolution change is desired or if a certain area needs a higher resolution or more detail. In some embodiments, the imager may be fixed to the UAV without the use of a gimbal.

The flight plan may allow for a dynamic movement of the UAV to capture a perspective image, or the like, by taking a turn such that the imager is not pointed down towards the ground or area to be imaged. This perspective image could provide another view of the area to be imaged, such as a partial 3D image showing the height of crops, damage to crops from the side, or the like. Multiple turns may be used to collect multiple images from these viewpoints that are not top down.

In still yet further embodiments, the flight plan may be adjusted such that the UAV is guided back to the landing site and/or the UAV is directed to attempt to land immediately. In certain embodiments, the flight plan can be dynamically created and/or changed based on updated information including, but not limited to, current wind speed or unknown obstacles within the flight plan. In still yet additional embodiments, the flight plan may be updated based upon an updated launching point determined at the launch site. In a number of embodiments, the flight plan can be altered mid-flight to return the UAV to the launch point in order to account for a sudden drop in battery life that could result in full power loss before the flight plan is completed. In certain embodiments, the data collected in a completed flight plan is utilized in future flight plans to determine potential energy usage for a future flight plan.

Figure 8:
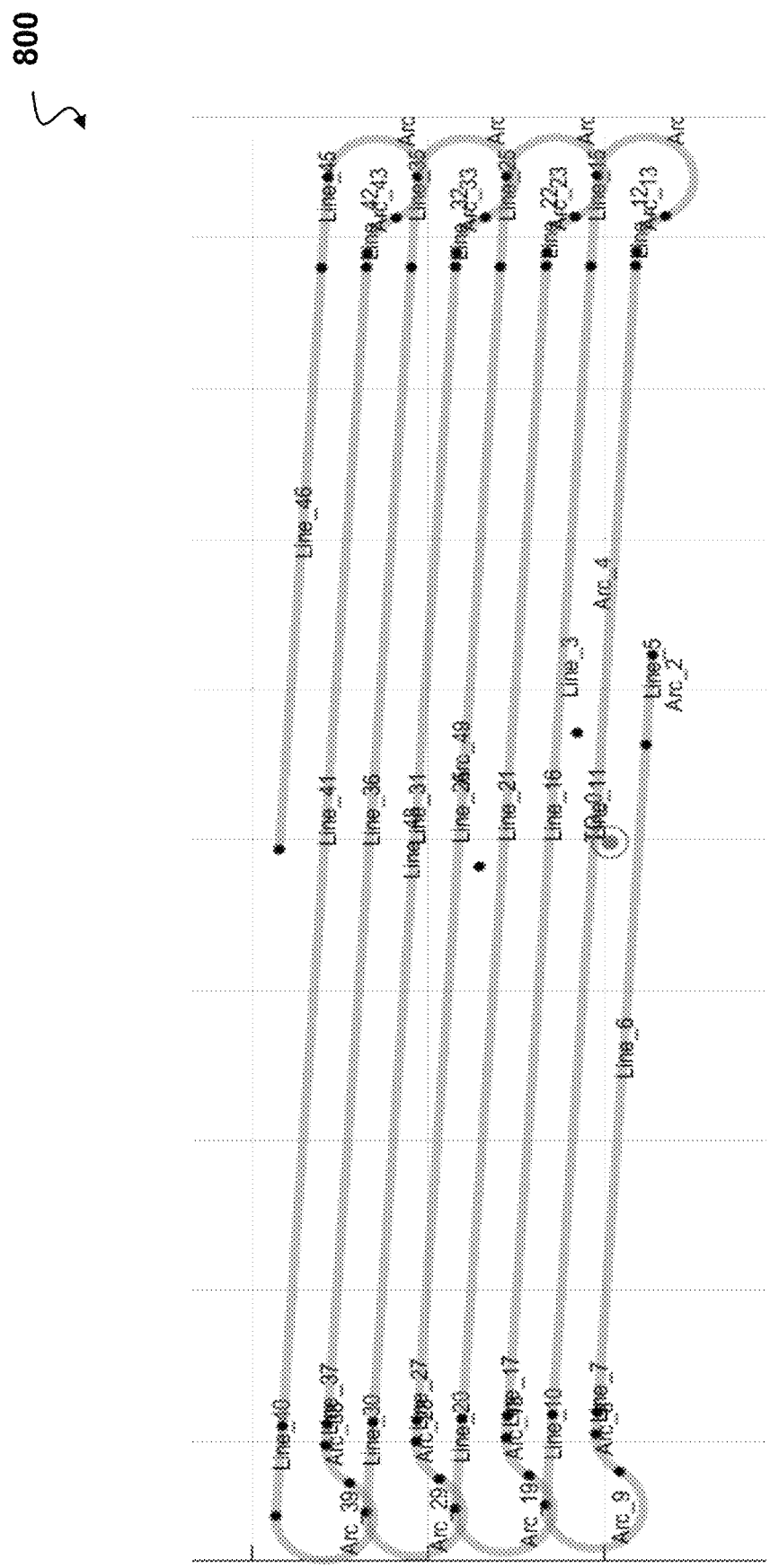
FIG. 8 depicts a determined flight plan in accordance with an embodiment of the invention.

FIG. 8 depicts a determined flight plan in accordance with an embodiment of the invention. The flight plan 800 comprises a series of flight segments that include straight lines, and arcs. In many embodiments, the radii of the various arcs are not smaller than the minimum turning radius of the aerial vehicle scheduled to conduct the flight plan. In a number of embodiments, the flight plan 800 will allow for the complete sensing of a pre-determined area within the sensing range of the aerial vehicle schedule to conduct the determined flight plan 800.

Figure 9:
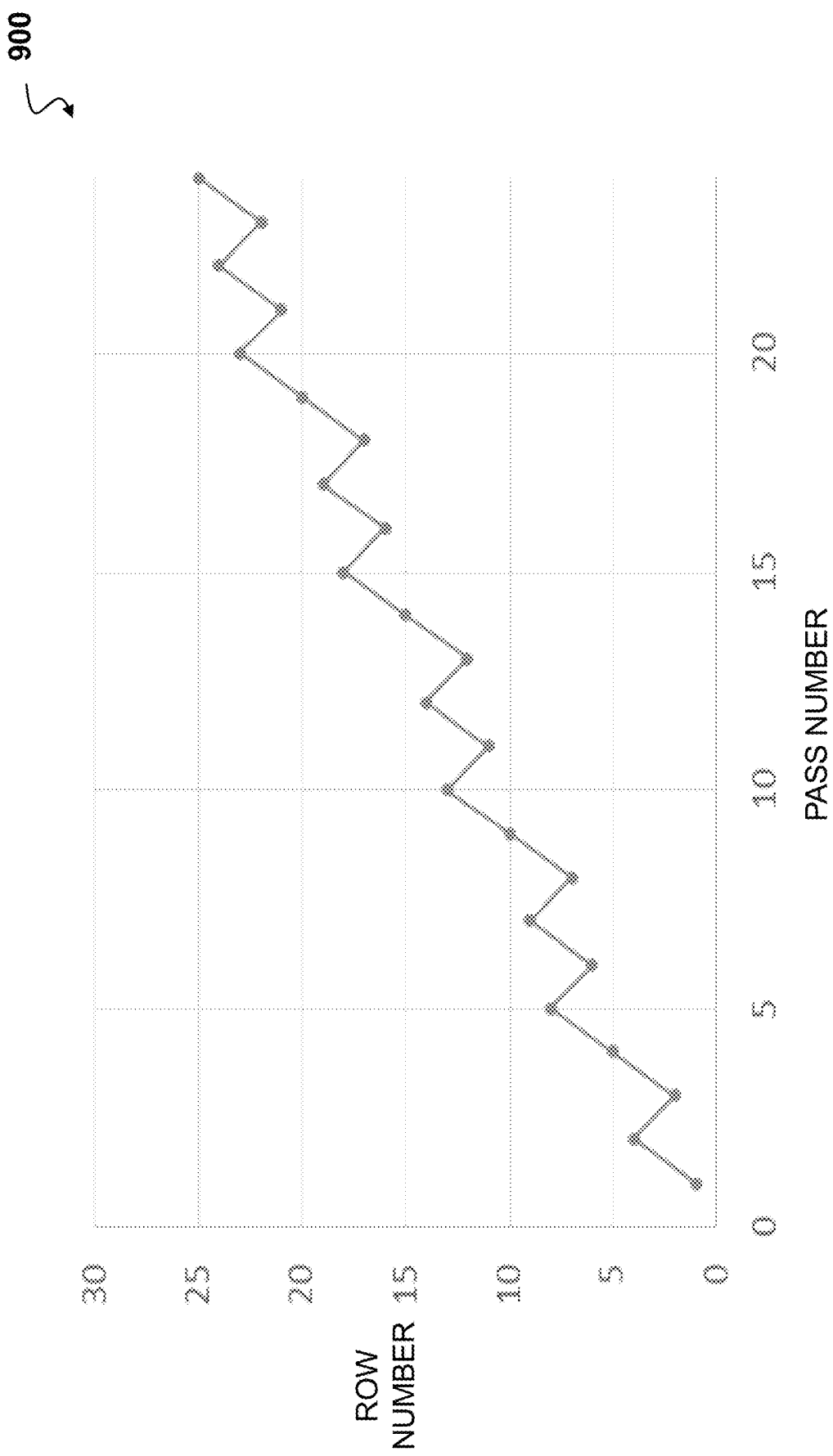
FIG. 9 depicts an output graph of a proof indicating that each row of a geographical area to be covered by the UAV sensors can be covered in a given number of passes.

FIG. 9 depicts an output graph 900 of a proof indicating that each row of a geographical area to be covered by the UAV sensors can be covered in a given number of passes. The horizontal axis is the pass number and the vertical axis is the row number. In this example, there are twenty-five passes and twenty-five row numbers. In many embodiments, this process describes a method for field coverage when the turn diameter of the UAV is greater than single row spacing. In a number of embodiments, this may allow for less time spent in turns, increasing energy efficiency. In additional embodiments, the method is to simply follow the sequence: a=[3,−2, 3,−2, 3], where at the end of each pass, select the next element of a to determine how many rows to skip. In further embodiments, this method is demonstrated in the graph 900 by plotting 24 rows using the following MAT-LAB® code to simply show that no rows are skipped or repeated:

```
a = [3,-2, 3,-2, 3];
b(1) = 1;
for i = 2:24
    ind = mod(i,length(a))+1;
    b(i) = b(i-1) + a(ind);
end
```

Figure 10A:
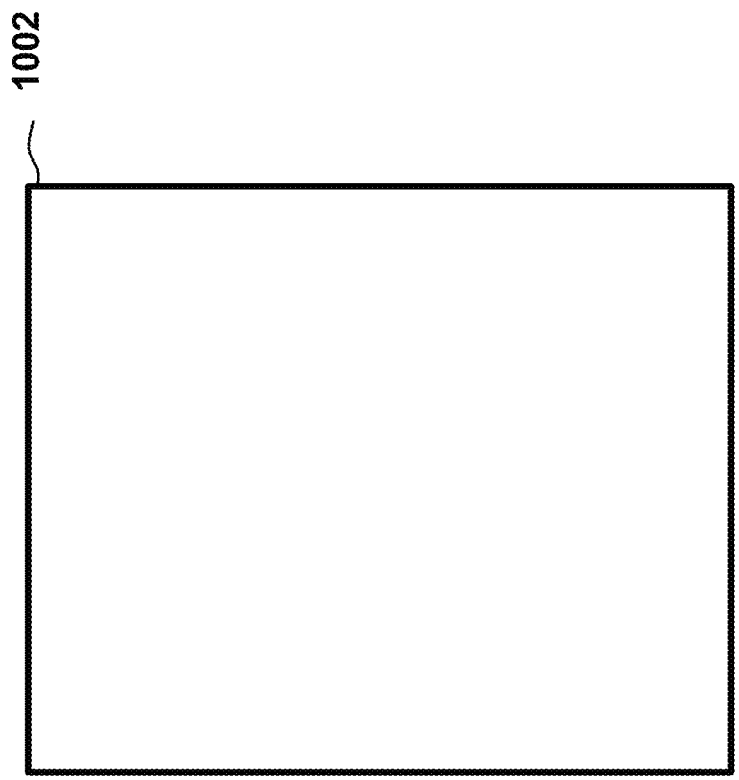
FIG. 10A depicts a sensor coverage of a geographical area by a UAV.
Figure 10A:
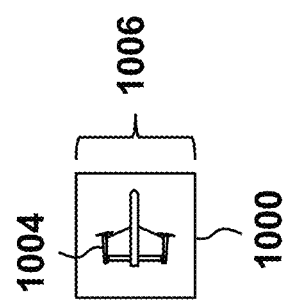

FIG. 10A depicts a sensor coverage 1000 of a geographical area 1002 by a UAV 1004. The sensor coverage 1000 is shown as a rectangle showing the geographical area imaged by one or more imagers of the UAV 1004 at a set height. As the UAV 1004 flies across the geographical area 1002 to be imaged, it will image an area having a width 1006 of the sensor coverage 1000. Increasing the altitude of the UAV 1004 may widen the width 1006 of the sensor coverage 1000, but reduce the image resolution and/or quality. Decreasing the altitude of the UAV 1004 may narrow the width 1006 of the sensor coverage 1000, but increase the image resolution and/or quality. In some embodiments, the UAV 1004 may fly at a substantially constant altitude, except for take-off and landing, to provide a substantially constant width 1006 of the sensor coverage 1000, image resolution, and/or image quality.

Figure 10B:
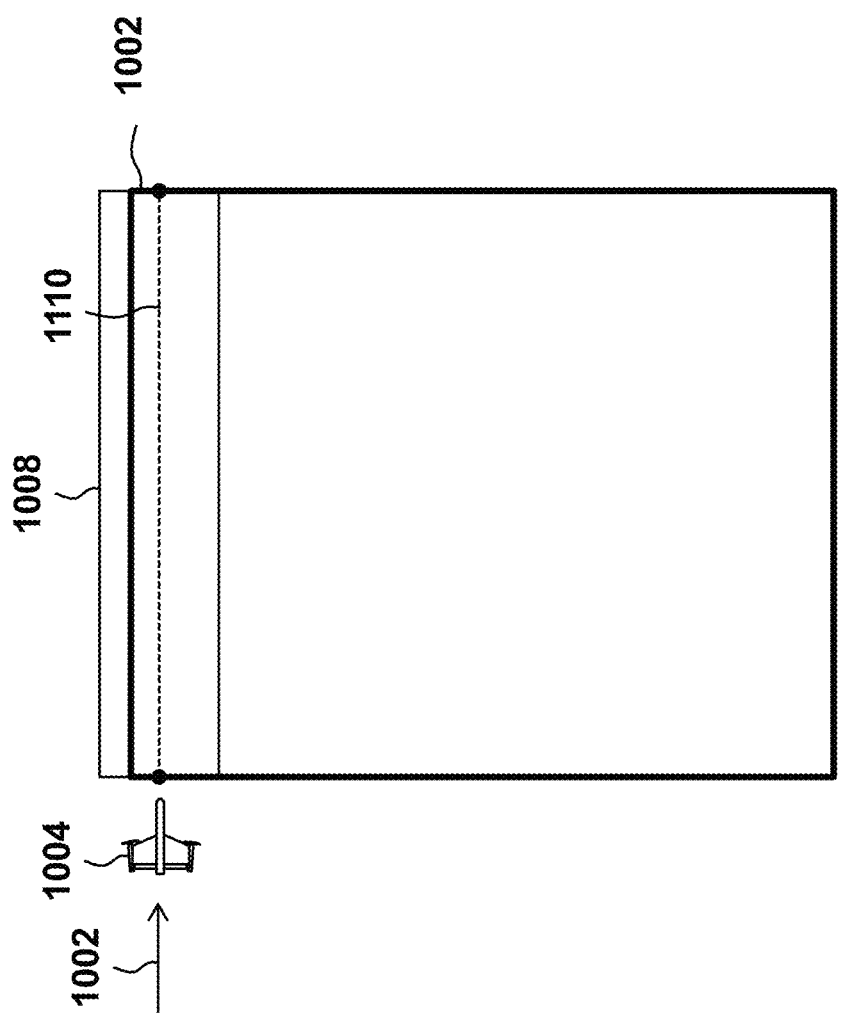
FIG. 10B depicts an overlaid sensor-area rectangle on the geographical area of FIG. 10A.
Figure 10C:
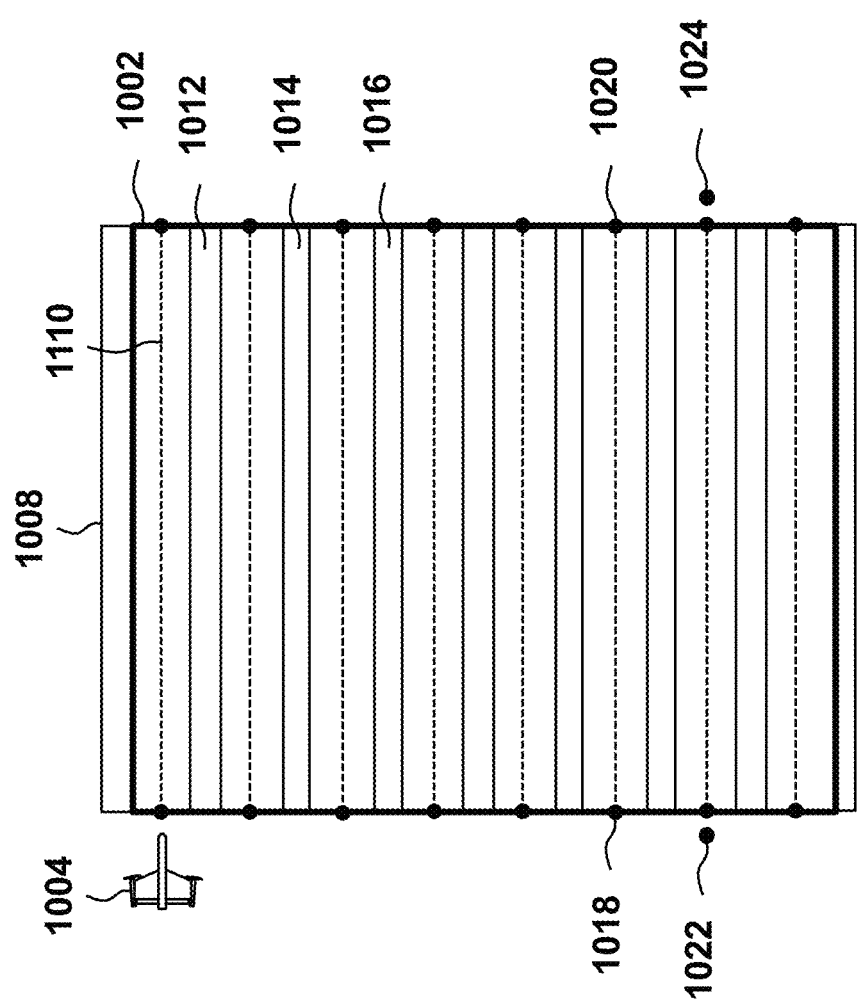
FIG. 10C depicts a plurality of overlaid sensor-area rectangles providing overlap of the geographical area of FIG. 10B.

FIG. 10B depicts an overlaid sensor-area rectangle 1008 on the geographical area 1002 of FIG. 10A. As the UAV 1004 approaches 1002 the geographical area 1002 it will capture images covering the overlaid sensor-area rectangle 1008. The overlaid sensor-area rectangle 1008 corresponds to the area imaged within the geographical area 1002 by one or more imagers of the UAV 1004. The overlaid sensor-area rectangle 1002 is based around the straight-line segment 1110 generally corresponding to the flight path of the UAV 1004.

FIG. 10C depicts a plurality of overlaid sensor-area rectangles 1008 providing overlap 1012, 1014, 1016 of the geographical area 1002 of FIG. 10B. The straight-line segments 1010 may be placed so as to provide overlap 1012, 1014, 1016 of the geographical area 1002. The overlap 1012, 1014, 1016 allows captured images of the geographical area 1012 to be stitched together. Image stitching may require several common identifying features or objects to ensure accuracy. In some embodiments, the overlap between each image may be 80%, such that 80% of each row is seen in the previous row. In embodiments where stitching is not required, the overlap may be minimized or eliminated.

End conditions 1018, 1020 may be located on the end of each sensor-area rectangle 1008. End conditions 1018, 1020 indicate where the geographical area 1002 ends. In some embodiments, end conditions 1018, 1020 may be waypoints with directions provided. In other embodiments, waypoints 1022, 1024 may be located outside of the geographical area 1002 and past the end conditions so as to ensure that the aerial vehicle does not attempt to start a turnaround until it has exited the geographical area 1002 to be imaged. End conditions 1018, 1020 and/or waypoints 1022, 1024 may include position, altitude, and orientation, where orientation is a direction the UAV 1004 needs to be heading when it passes through the end condition 1018, 1020 and/or waypoint 1022, 1024. In some embodiments, end conditions 1018, 1020 are not used, and instead utilize information from both the starting and ending of a flight path.

Figure 11A:
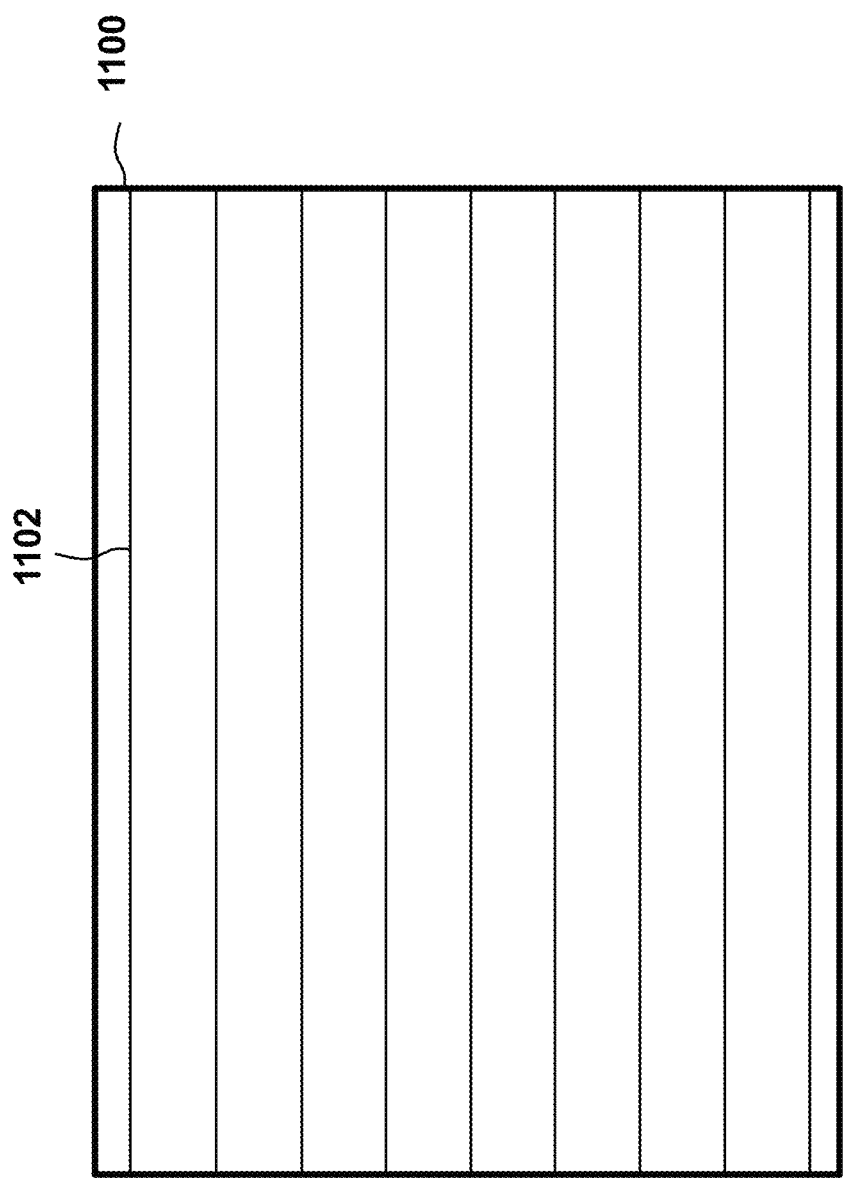
FIG. 11A depicts a flight plan optimization for straight-line segments covering a geographical area to be imaged.

FIG. 11A depicts a flight plan optimization for straight-line segments covering a geographical area 1100 to be imaged. The system disclosed herein may overlay a series of parallel straight-line segments 1102 that cover the geographical area 1100 to be imaged. The spacing between the straight-line segments 1102 may be based on a sensor-area coverage and desired overlap, as shown in FIGS. 10A-10C.

Figure 11B:
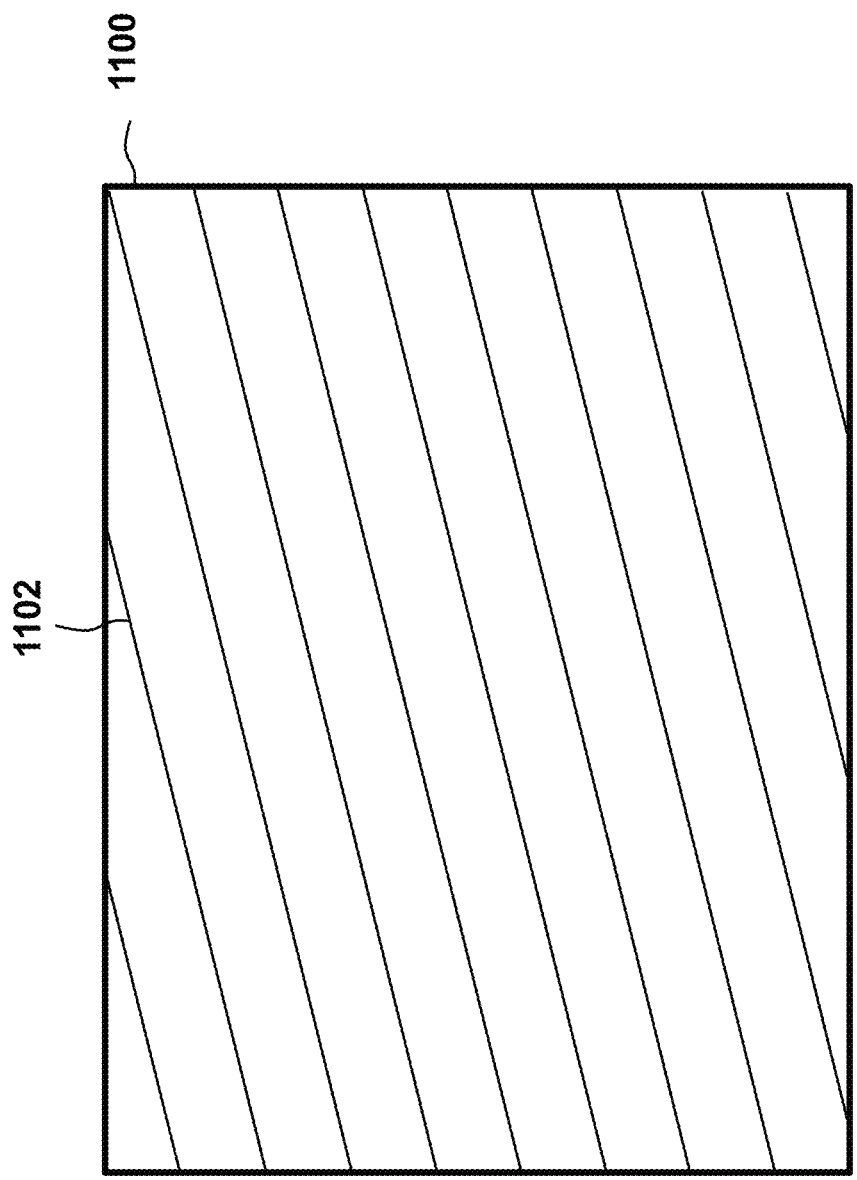
FIG. 11B depicts a flight plan optimization for straight-line segments covering the geographical area of FIG. 11A with the straight-line segments rotated.

FIG. 11B depicts a flight plan optimization for straight-line segments 1102 covering the geographical area 1100 of FIG. 11A with the straight-line segments 1102 rotated. The system may test for an optimal flight plan by calculating a flight plan for the straight-line segments as shown in FIG. 11A, and then rotate 1104 the straight-line segments 1102 by a set amount, such as five degrees, and determine a new flight plan.

Figure 11C:
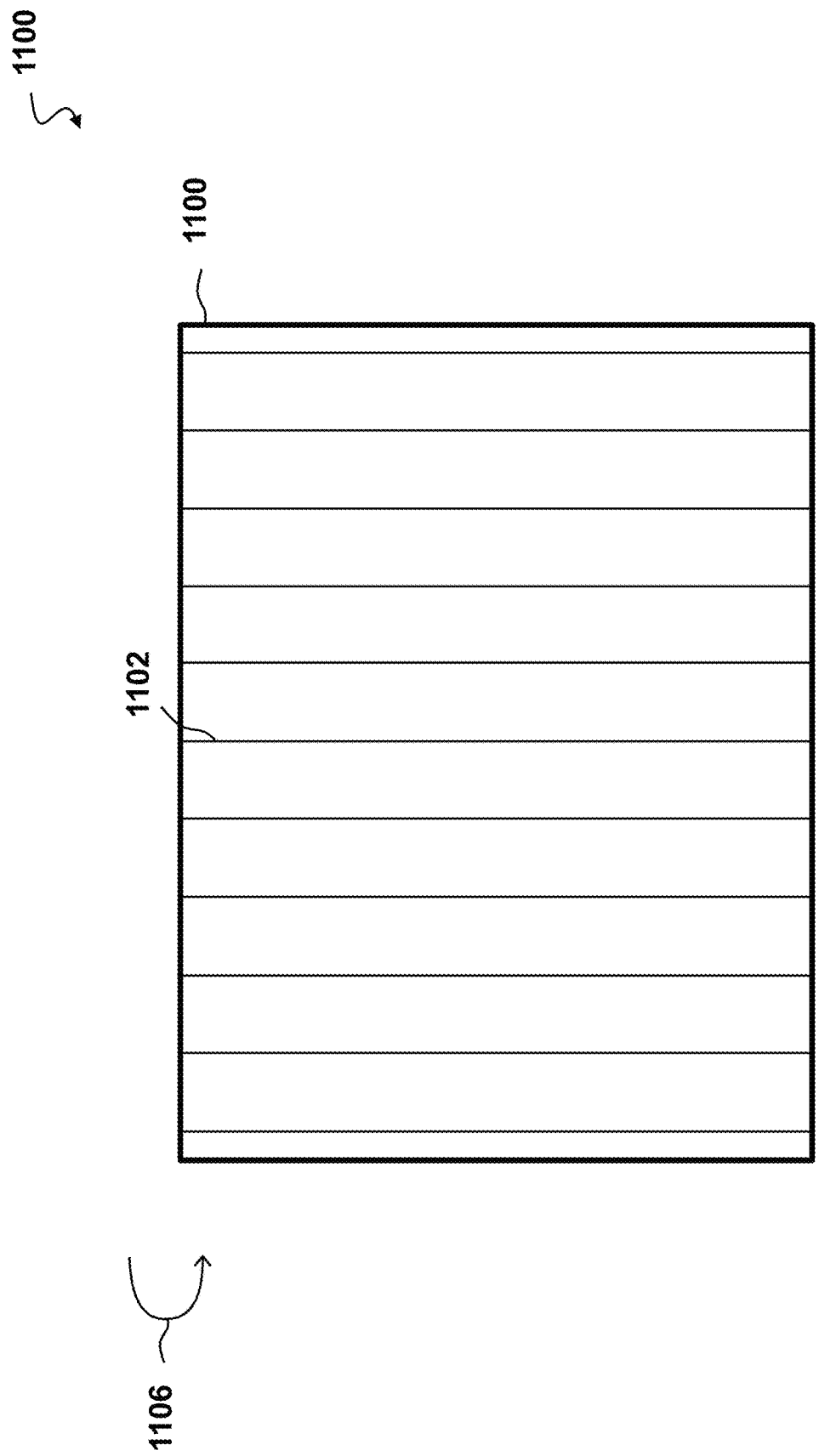
FIG. 11C depicts a flight plan optimization for straight-line segments covering the geographical area of FIG. 11A with the straight-line segments further rotated.

FIG. 11C depicts a flight plan optimization for straight-line segments 1102 covering the geographical area 1100 of FIG. 11A with the straight-line segments 1102 further rotated 1106. The system disclosed herein may generate flight plans based on an orientation of the straight-line segments 1102 rotated 1106 between an initial position, as shown in FIG. 11A, and a perpendicular position, as shown in FIG. 11C at set segments. For example, the system may generate flight plans at five-degree increments to determine an ideal flight plan. Factors that influence the orientation of the straight-line segments may include wind speed, wind direction, the shape of the geographical area 1110, the dimensions of the geographical area 1110, the presence of any obstacles in the geographical area 1100, and the like. These determinations may also factor in the take-off location, landing location, and/or any turnarounds connecting the straight-line segments 1102. While the straight-line segments are depicted as straight, they may be any shape so long as the desired image resolution and/or overlap is achieved. For example, the straight-line segments may have a wavy or arcuate shape and be substantially parallel to one another.

FIG. 12A depicts generating a flight path 1200 that connects straight-line segments 1202 covering a geographical area 1204 to be imaged. FIG. 12B depicts a library of flight segments 1300 used to construct the turnarounds connecting the straight-line segments in FIG. 12A. The aerial vehicle enters the geographical area at a first waypoint 1206. The aerial vehicle flies from the take-off location to the starting waypoint 1206. The aerial vehicle ends imaging at a last waypoint 1208. The aerial flies from the last waypoint 1208 to the landing location. The flight path 1200 may be optimized to include the distance from the take-off location to the first waypoint 1206 and from the last waypoint 1208 to the landing location.

Each straight-line segment 1202 may be connected to another straight-line segment by a turnaround 1210. Each turnaround 1210 contains one or more connecting segments 1212, 1214. The connecting segments 1212, 1214 may be arcuate segments and/or straight-line connectors. Each connecting segment 1212, 1214 may be stored in a library of flight segments 1300, as shown in FIG. 12B. Not all connecting segments 1212 may be available to each aerial vehicle. For example, some flight segments may be limited based on the characteristics of the aerial vehicle, such as the aerial vehicle's turning radius, maximum speed, and the like. Not all aerial vehicles are able to accomplish all flight segments. The flight segments available to be used when creating the flight path 1200 may be based on the characteristics of the aerial vehicle.

The library 1300 may be specific to the aerial vehicle being used, e.g., based on turn radius. Every segment in the library 1300 may not be useable or accessible. For example, a segment may require a turn radius that doesn't work for the aerial vehicle being used to image the geographical area 1204. As another example, there are segments in the library 1300 that a quad rotor may be able to accomplish that a plane in horizontal flight could not. Each vehicle may allow for a selection of different segments from the library 1300.

In additional embodiments, the process disclosed herein may utilize a number of segment shapes from a pre-defined library 1300 of flight segments. In still additional embodiments, the pre-defined library 1300 of flight segments may be generated based upon the characteristics of the aerial vehicle. In additional embodiments, the potential lines and/or arcuate paths may be provided by an external source such as, but not limited to, a library 1300 of flight segment shapes or the aerial vehicle. In still additional embodiments, the potential lines and/or arcuate paths of the flight segments may have an associated length or overall energy expenditure associated with each corresponding shape. In further embodiments, the aerial vehicle system may generate a flight plan by connecting the starting points and end points of the straight-lines such that only a starting point and end point may have a single connection to other points and every other remaining point is limited to connections with two other points. In certain further embodiments, this process can repeat indefinitely until the entire geographical area 1204 is covered by the sensors of the aerial vehicle.

In some embodiments, the end conditions at the end of each straight-line segment 1202 may be extended to a waypoint 1216. The extended position of the waypoint relative to the end of the geographical area 1204 may ensure that the aerial vehicle maintains a flight path substantially in-line with each of the straight-line segments prior to effecting any turns in the turnaround 1210 sections of the flight path.

In the embodiment shown in FIG. 12A the flight path is substantially shown as two-dimensions. Altitude and/or speed, as a third-dimension and/or fourth-dimension, may be added to the two-dimensional planning to ensure ease of use by a user or operator creating or reviewing the flight plan on a processor having addressable memory. In some embodiments, the flight plan may be viewed, created, and/or modified in three-dimensions or four-dimensions.

In some embodiments, a flight plan may not be able to be completed by a selected aerial vehicle on a single charge. If so, the flight plan may be divided into multiple parts. In one embodiment, multiple aerial vehicles may be used to complete different parts of the flight plan, either at the same time or sequential. In other embodiments, the same aerial vehicle may be used to complete multiple parts of the flight plan. Once the aerial vehicle lands, it may be refueled and/or have its battery swapped out to allow for completion of the next part of the flight plan. In some embodiments, a flight plan may be divided into two or more parts and a separate aerial vehicle may be used to accomplish each part. In some embodiments, the aerial vehicle may have a sense and avoid system to avoid collision with another aerial vehicle, obstacle, or the like.

Figure 13:
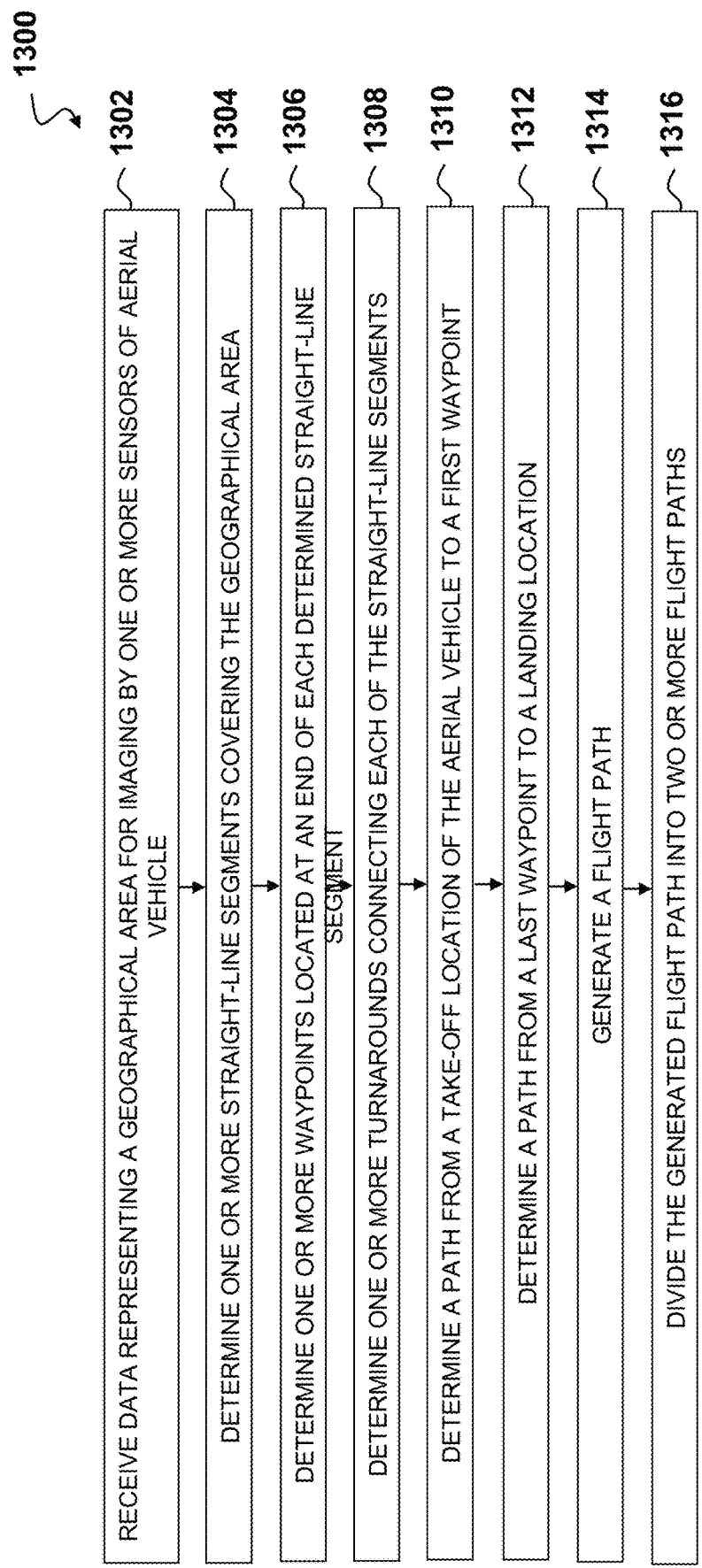
FIG. 13 depicts a flowchart of a method for generating a flight path to image a geographical area.

FIG. 13 depicts a flowchart of a method 1300 for generating a flight path to image a geographical area. The method 1300 may include receiving data representing a geographical area for imaging by one or more sensors of the aerial vehicle (step 1302). A user or system may set a desired geographical area for imaging, such as an agricultural field containing crops, vegetation, or the like. The desired geographical area may also include restrictions, such as avoiding certain geographical areas. These restrictions can avoid the need for impromptu changes, such as a revised flight plan that may cause the aerial vehicle to fly over a restricted area, once the air vehicle is in the air. The aerial vehicle may be a vertical take-off and landing (VTOL) aerial vehicle, an unmanned aerial vehicle (UAV), and/or a VTOL UAV.

The method 1300 may then include determining one or more straight-line segments covering the geographical area (step 1304). The number and placement of the straight-line segments may be based on at least one of: a desired image resolution and a desired overlap. In some embodiments, the straight-line segments may be rotated in set increments such that a flight path can be selected that uses the least amount of energy by the aerial vehicle to complete. Each of the determined one or more straight-line segments may be substantially parallel to each of the other determined one or more straight-line segments.

The method 1300 may then include determining one or more waypoints located at an end of each determined straight-line segment (step 1306). Each waypoint may include a geographical location, an altitude, and a direction of travel. The direction of travel of each waypoint is the direction of travel of the aerial vehicle as the aerial vehicle passes through the waypoint.

The method 1300 may then include determining one or more turnarounds connecting each of the straight-line segments (step 1308). Each turnaround may include one or more connecting segments. The one or more connecting segments may include one or more arcuate segments and/or one or more straight-line connectors. The one or more connecting segments may be based on the aerial vehicle characteristics. Each of the one or more connecting segments may include a starting point, a middle point, and an end point.

The method 1300 may then include determining a path from a take-off location of the aerial vehicle to a first waypoint (step 1310).

The method 1300 may then include determining a path from a last waypoint of to a landing location of the aerial vehicle (step 1312).

The method 1300 may then include generating a flight plan for the aerial vehicle (step 1314). The generated flight plan may include the determined path from the take-off location of the aerial vehicle to the first waypoint, the determined one or more straight-line segments, the determined one or more turnarounds connecting each straight-line segment, and/or the determined path from the last waypoint to the landing location of the aerial vehicle. The generated flight path may be viewed in two-dimensions. Once the flight plan is completed, the altitudes along the flight plan may be increased. An altitude may be set for each position in the flight plan. The speed of the aerial vehicle at each position in the flight plan may also be adjusted to be faster or slower. The flight path may be based on at least one of: a wind speed, a wind direction, a shape of the geographical area, dimensions of the geographical area, and a presence of any obstacles in the geographical area The method 1300 may include dividing the generated flight path into tow or more flights paths if the flight path cannot or is not desired to be completed in a single flight path (step 1316). In some embodiments, the plan may be divided into multiple flight plans after execution of the flight plan. For example, if wind conditions require the use of additional battery, then the aerial vehicle may need to land prior to the completion of the flight plan. The system may ask the user or operator whether the mission should be completed from where it stopped due to wind or other effects. In some embodiments, the flight plan may be modified based on detected obstacles. Obstacles may be detected by a sense and avoid system. In embodiments without a sense and avoid system, the imager may be used to detect objects. For example, in an embodiment with a fixed imager the aerial vehicle may perform one or more maneuvers that provide a different field of view from the field imager to provide additional views of surrounding objects so as to avoid those objects.

Figure 14:
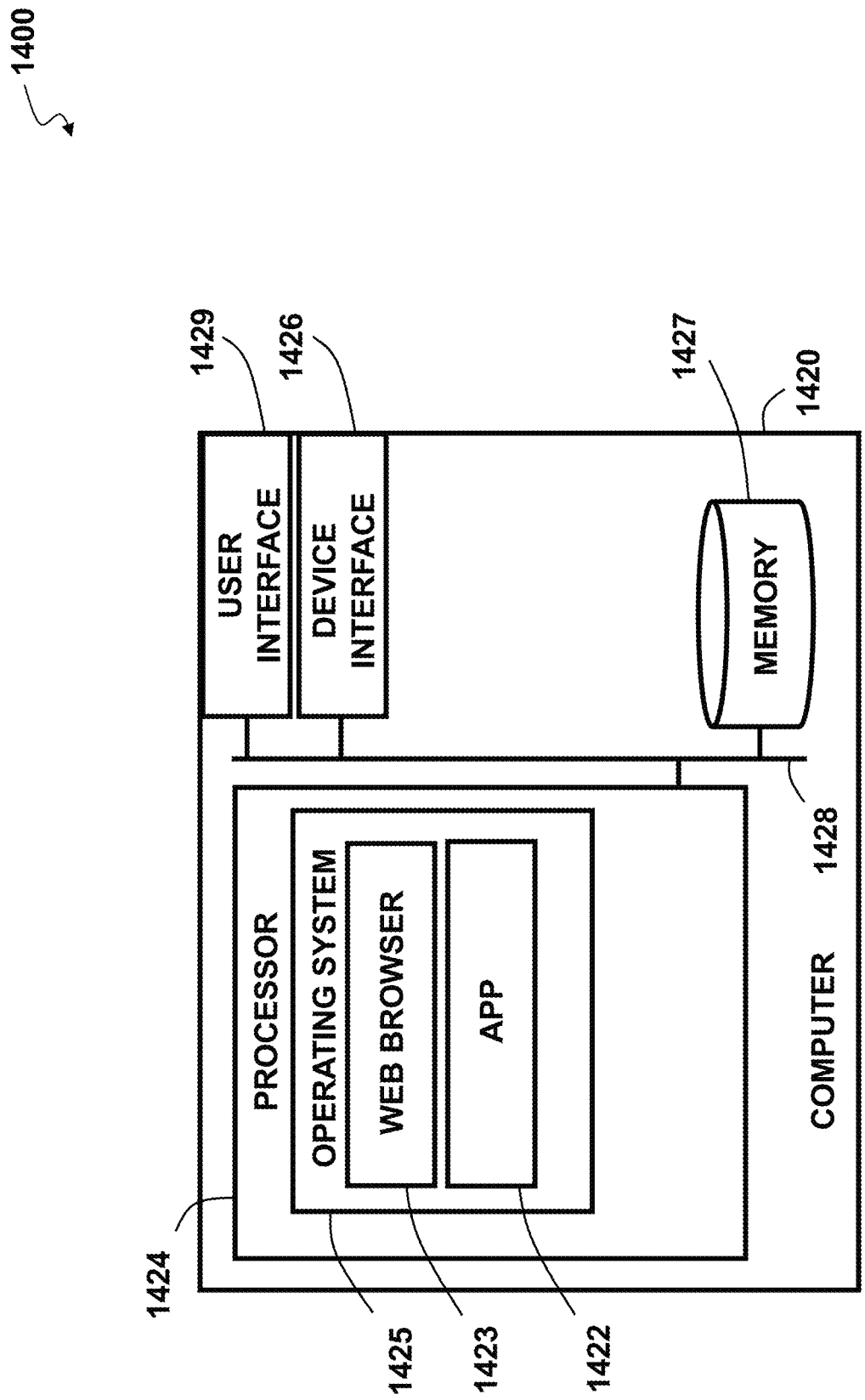
FIG. 14 illustrates an exemplary top-level functional block diagram of a computing device embodiment of an imaging system.

FIG. 14 illustrates an exemplary top-level functional block diagram of a computing device embodiment of a flight path generation system, such as an aerial vehicle, UAV, ground controller, or the like. The exemplary embodiment

1400 is shown as a computing device 1420 having a processor 1424, such as a central processing unit (CPU), addressable memory 1427, an external device interface 1426, e.g., an optional universal serial bus port and related processing, and/or an Ethernet port and related processing, and an optional user interface 1429, e.g., an array of status lights and one or more toggle switches, and/or a display, and/or a keyboard and/or a pointer-mouse system and/or a touch screen. Optionally, the addressable memory 1427 may for example be: flash memory, eprom, and/or a disk drive or other hard drive. These elements may be in communication with one another via a data bus 1428. The processor 1424 may have an operating system 1425 such as one supporting a web browser 1423 and/or applications 1422, which may be configured to execute steps of a process according to the exemplary embodiments described herein.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A method comprising:
   determining, by a processor having addressable memory, two or more flight paths based on a rotation of each straight-line segment by set increments;
   selecting, by the processor, a flight path of the determined two or more flight paths at an increment of the set increments using the least energy by an aerial vehicle to complete;
   generating, by the processor, a flight plan for the aerial vehicle comprising the determined one or more straight-line segments and one or more turnarounds connecting each straight-line segment; and
   controlling, by the processor, the aerial vehicle based on the generated flight plan.

2. The method of claim 1, wherein each flight path of the two or more flight paths corresponds to one or more sensor-area rectangles, and wherein each of the one or more sensor-area rectangles includes rows.

3. The method of claim 1, further comprising:
   determining, by the processor, one or more straight-line segments covering a geographical area.

4. The method of claim 1, further comprising:
   receiving, by the processor, data representing the geographical area for imaging by one or more sensors of the aerial vehicle.

5. The method of claim 1, further comprising:
   determining, by the processor, one or more waypoints located at an end of each determined straight-line segment, wherein each waypoint comprises a geographical location, an altitude, and a direction of travel, and wherein the direction of travel of each waypoint is the direction of travel of the aerial vehicle as the aerial vehicle passes through the waypoint.

6. The method of claim 5, further comprising:
   determining, by the processor, the one or more turnarounds connecting each of the straight-line segments, wherein each turnaround comprises one or more connecting segments.

7. The method of claim 5, further comprising:
   determining, by the processor, a path from a take-off location of the aerial vehicle to a first waypoint of the one or more waypoints, wherein the first waypoint is the first waypoint reached by the aerial vehicle after take-off of the aerial vehicle.

8. The method of claim 1, further comprising:
   determining, by the processor, a path from a last waypoint of the one or more waypoints to a landing location of the aerial vehicle, wherein the last waypoint is the last waypoint reached by the aerial vehicle prior to landing of the aerial vehicle, wherein the generated flight path further comprises: a determined path from the take-off location of the aerial vehicle to a first waypoint and the determined path from the last waypoint to the landing location of the aerial vehicle.

9. The method of claim 1, further comprising:
   acquiring a completed flight plan; and
   determining a potential energy usage for a future flight plan based on the acquired completed flight plan.

10. The method of claim 1, wherein a row spacing of the rows in the selected flight path is less than a turn diameter of the aerial vehicle, and wherein the rows of the selected flight path are unskippable.

11. The method of claim 1, wherein the determined one or more straight-line segments are spaced within the geographical area for imaging based on at least one of: a desired image resolution and a desired image overlap, wherein the aerial vehicle is a vertical take-off and landing (VTOL) aerial vehicle, and wherein the geographical area for imaging comprises vegetation.

12. The method of claim 1, wherein the selected flight path is based on at least one of: a wind speed, a wind direction, a shape of the geographical area, dimensions of the geographical area, and a presence of any obstacles in the geographical area.

13. The method of claim 1, wherein a row spacing of the rows in the selected flight path is less than a turn diameter of the aerial vehicle.

14. The method of claim 1, wherein the rows of the selected flight path are unskippable.

15. The method of claim 1, further comprising:
   dividing, by the processor, the generated flight plan for the aerial vehicle into two or more flight plans based on the aerial vehicle characteristics.

16. A system comprising:
   a processor having addressable memory, the processor configured to:
      determine two or more flight paths based on a rotation of each straight-line segment by set increments;
      select a flight path of the determined two or more flight paths at an increment of the set increments using the least energy by an aerial vehicle to complete;
      generate a flight plan for the aerial vehicle, the flight plan comprising: the determined one or more straight-line segments and one or more turnarounds connecting each straight-line segment; and
      control the aerial vehicle based on the generated flight plan.

17. The system of claim 16, wherein each flight paths of the two or more flight paths corresponds to one or more sensor-area rectangles associated with the geographical area, and wherein each of the one or more sensor-area rectangles includes rows.

18. The system of claim 16, wherein the processor is further configured to:
   determine one or more straight-line segments covering a geographical area.

19. The system of claim 16, wherein the processor is further configured to:

acquire a completed flight plan and determining a potential energy usage for a future flight plan based on the acquired completed flight plan, wherein the determined one or more straight-line segments are spaced within the geographical area for imaging based on at least one of: a desired image resolution and a desired image overlap, and wherein each of the determined one or more straight-line segments is substantially parallel to each of the other determined one or more straight-line segments.

20. The system of claim 16, wherein a row spacing of the rows in the selected flight path is less than a turn diameter of the aerial vehicle, and wherein the rows of the selected flight path are unskippable.

* * * * *